(12) United States Patent
Arihara et al.

(10) Patent No.: US 10,847,811 B2
(45) Date of Patent: Nov. 24, 2020

(54) CATALYST PARTICLE, AND ELECTRODE CATALYST, ELECTROLYTE MEMBRANE-ELECTRODE ASSEMBLY, AND FUEL CELL USING THE SAME

(71) Applicant: NISSAN MOTOR CO., LTD., Yokohama (JP)

(72) Inventors: Kazuki Arihara, Kanagawa (JP); Hiroyuki Tanaka, Kanagawa (JP); Hisashi Mitsumoto, Kanagawa (JP); Takahiro Kaito, Kanagawa (JP); Seiho Sugawara, Kanagawa (JP); Tsukuru Ohwaki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 81 days.

(21) Appl. No.: 15/992,349

(22) Filed: May 30, 2018

(65) Prior Publication Data
US 2018/0277856 A1    Sep. 27, 2018

Related U.S. Application Data

(62) Division of application No. 14/910,872, filed as application No. PCT/JP2014/070693 on Aug. 6, 2014, now Pat. No. 10,014,532.

(30) Foreign Application Priority Data

| Aug. 9, 2013 | (JP) | 2013-166139 |
| Jun. 10, 2014 | (JP) | 2014-119859 |
| Jun. 13, 2014 | (JP) | 2014-122812 |
| Jun. 13, 2014 | (JP) | 2014-122819 |

(51) Int. Cl.
| H01M 4/92 | (2006.01) |
| C22C 5/04 | (2006.01) |
| H01M 4/88 | (2006.01) |
| H01M 8/1018 | (2016.01) |
| C22F 1/14 | (2006.01) |
| H01M 8/1004 | (2016.01) |

(52) U.S. Cl.
CPC ............ *H01M 4/926* (2013.01); *C22C 5/04* (2013.01); *H01M 4/8882* (2013.01); *H01M 4/921* (2013.01); *C22F 1/14* (2013.01); *H01M 8/1004* (2013.01); *H01M 2008/1095* (2013.01)

(58) Field of Classification Search
CPC .... H01M 4/926; H01M 4/8882; H01M 4/921; H01M 8/1004; H01M 2008/1095; C22C 5/04; C22F 1/14
See application file for complete search history.

(56) References Cited

U.S. PATENT DOCUMENTS

| 4,677,092 A | 6/1987 | Luczak et al. |
| 5,024,905 A | 6/1991 | Itoh et al. |
| 5,189,005 A | 2/1993 | Watanabe et al. |
| 5,489,563 A | 2/1996 | Brand et al. |
| 9,368,805 B2 | 6/2016 | Tada et al. |
| 2010/0310950 A1 | 12/2010 | Min et al. |
| 2012/0135137 A1 | 5/2012 | Roh et al. |
| 2013/0034803 A1 | 2/2013 | Adzic et al. |
| 2013/0244137 A1* | 9/2013 | Tada ................. H01M 4/926 429/524 |
| 2013/0259921 A1 | 10/2013 | Hossainy |

FOREIGN PATENT DOCUMENTS

| CN | 102784641 | 11/2012 |
| CN | 103055893 A | 4/2013 |
| EP | 2 650 956 A1 | 10/2013 |
| JP | 62-155940 A | 7/1987 |
| JP | 01-227360 A | 9/1989 |
| JP | 06-176766 A | 6/1994 |
| JP | 06-097615 B2 | 11/1994 |
| JP | 08-057317 A | 3/1996 |
| JP | 2010-027364 A | 2/2010 |
| JP | 2010-198885 A | 9/2010 |
| JP | 2010-282947 A | 12/2010 |
| TW | 201232909 A | 8/2012 |
| WO | WO-2010/033829 A1 | 3/2010 |
| WO | WO-2011/116169 A2 | 9/2011 |
| WO | WO-2011/160022 A1 | 12/2011 |

OTHER PUBLICATIONS

Liufeng Xiong et al., Influence of Atomic Ordering on the Electrocatalytic Activity of Pt-Co Alloys in Alkaline Electrolyte and Proton Exchange Membrane Fuel Cells, Journal of Materials Chemistry, 14, 2004, pp. 1454-1460.

Mukerjee et al., "Enhanced electrocatalysis of oxygen reduction on platinum alloys in proton exchange membrane fuel cells," J. Electroanal. Chem., vol. 357, 1993, pp. 201-224.

S. Sugawara et al., Development of Advanced Electrocatalyst for Automotive Polymer Electrolyte Fuel Cells, ECS Transactions, 58 (1), The Electrochemical Society, Oct. 27, 2013, pp. 49-56.

Seiho Sugawara et al., Development of Advanced Electrocatalyst for Automotive Polymer Electrolyte Fuel Cells, 224th ECS Meeting, The Electrochemical Society, Oct. 27, 2013, 1 page.

Seiho Sugawara et al., Development of Advanced Electrocatalyst for Automotive Polymer Electrolyte Fuel Cells, Abstract, ECS Transactions, http://ecst.ecsdl.org/content/58/1/49.abstract, Feb. 17, 2016, 1 page.

(Continued)

*Primary Examiner* — Muhammad S Siddiquee
(74) *Attorney, Agent, or Firm* — Foley & Lardner LLP

(57) ABSTRACT

An object is to provide a catalyst particle that can exhibit high activity. The catalyst particle is an alloy particle formed of platinum atom and a non-platinum metal atom, wherein (i) the alloy particle has an $L1_2$ structure as an internal structure and has an extent of ordering of $L1_2$ structure in the range of 30 to 100%, (ii) the alloy particle has an LP ratio calculated by CO stripping method of 10% or more, and (iii) the alloy particle has a $d_N/d_A$ ratio in the range of 0.4 to 1.0.

5 Claims, 1 Drawing Sheet

(56) References Cited

OTHER PUBLICATIONS

Seiho Sugawara et al., Development of Advanced Electrocatalyst for Automotive Polymer Electrolyte Fuel Cells, Presentation Material, 224th ECS Meeting, Oct. 27, 2013, 35 pages.
Wang et al., "Structurally ordered intermetallic platinum-cobalt core-shell nanoparticles with enhanced activity and stability as oxygen reduction electrocatalysts," Nature Materials, vol. 12, Jan. 2013, pp. 81-87.
Lazarro et al., "Chapter 2 • Study and Application of Carbon Black Vulcan XC-72R in Polymeric Electrolyte Fuel Cells" in "Carbon Black: Production, Properties and Uses", Ed. I.J. Sanders, T. L. Peeten, Nova Science Publishers, Inc., 2011.
Orion, What is Carbon Black?, Orion Engineered Carbons GmbH, Jun. 2015.
Adela Eguizabal et al., Efficient and Facile Tuning of Vulcan XC72 with Ultra-Small Nanoparticles for Electrocatalytic Applications, RSC Advances, vol. 5, No. 110, the Royal Society of Chemistry, Jan. 1, 2015, pp. 90691-90697.
Carmo et al: Physical and Electrochemical Evaluation of Commercial Carbon Electrocatalysts Supports for DMFC Applications, Journal of Power Sources, vol. 173, No. 2, Oct. 15, 2007, pp. 860-866.
Notice of Opposition against Patent EP-B-3 032 624, Oct. 4, 2018, 16 pages.
Summons, European Application No. 14834999.6, Jun. 21, 2019, 17 pages.
Brief Communication and Annexes A-C, European Application No. 14834999.6, Jan. 10, 2020, 27 pages.

\* cited by examiner

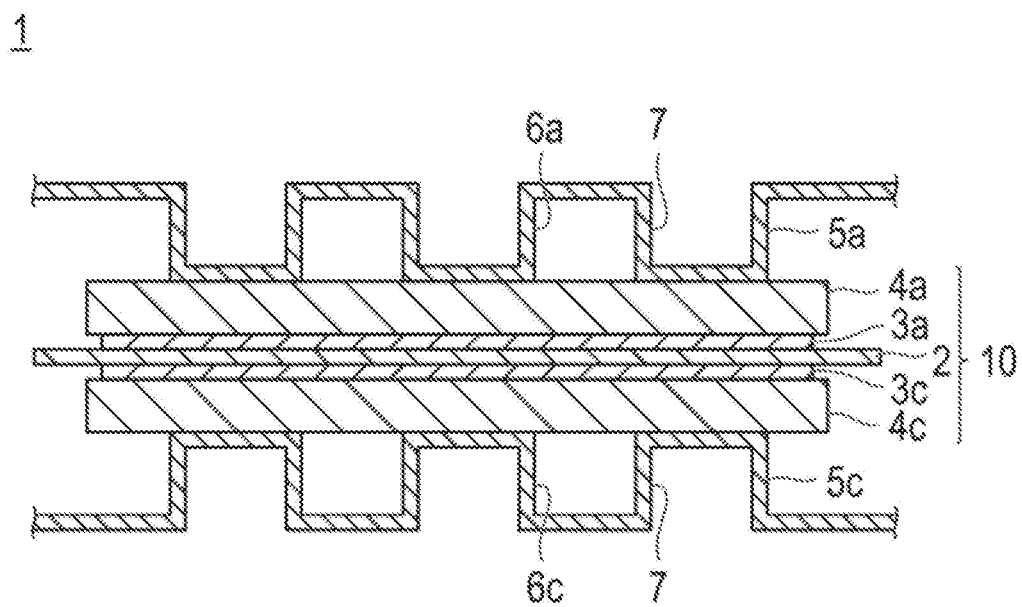

CATALYST PARTICLE, AND ELECTRODE CATALYST, ELECTROLYTE MEMBRANE-ELECTRODE ASSEMBLY, AND FUEL CELL USING THE SAME

CROSS REFERENCE TO RELATED APPLICATIONS

This application is a divisional of U.S. application Ser. No. 14/910,872, filed on Feb. 8, 2016, which is the National Stage Application of PCT/JP2014/070693, filed on Aug. 6, 2014, which claims benefit of priority from the prior Japanese Application Nos. 2013-166139, filed on Aug. 9, 2013, 2014-119859, filed on Jun. 10, 2014, 2014-122819, filed on Jun. 13, 2014, and 2014-122812, filed on Jun. 13, 2014; the entire contents of all of which are incorporated herein by reference.

TECHNICAL FIELD

The present invention relates to a catalyst particle, and an electrode catalyst, an electrolyte membrane-electrode assembly, and a fuel cell using the catalyst particle. In particular, the present invention relates to a catalyst particle which can exhibit high activity, and an electrode catalyst, an electrolyte membrane-electrode assembly, and a fuel cell using the catalyst particle.

BACKGROUND ART

In recent years, in response to social demands and movements arising from energy and environmental issues, a fuel cell capable of being operated at normal temperature to obtain high power density has been attracting attention as a power source for electric vehicles and as a stationary power source. A fuel cell is a clean power generation system wherein water is principally generated by an electrode reaction and there are almost no adverse impacts on the global environment. In particular, a polymer electrolyte fuel cell (PEFC) is anticipated to be a power source for electric vehicles because the PEFC is operated at a relatively low temperature. Generally, the polymer electrolyte fuel cell has a structure wherein an electrolyte membrane-electrode assembly (MEA) is interposed by separators. The electrolyte membrane-electrode assembly is configured such that a polymer electrolyte membrane is interposed by a pair of electrode catalyst layers and a pair of gas diffusion electrodes (gas diffusion layers; GDLs).

In the polymer electrolyte fuel cell having the electrolyte membrane-electrode assembly as described above, an electrode reaction represented by the following reaction proceeds according to polarities of both electrodes (cathode and anode) interposing the solid polymer electrolyte membrane to yield electrical energy. First, hydrogen contained in a fuel gas supplied to the anode (negative electrode) side is oxidized by a catalyst component, to form a proton and an electron ($2H_2 \rightarrow 4H^+ + 4e^-$: Reaction 1). Next, the produced proton reaches a cathode (positive electrode)-side electrode catalyst layer through a solid polymer electrolyte contained in the electrode catalyst layer and the solid polymer electrolyte membrane contacting the electrode catalyst layer. In addition, the electron produced in the anode-side electrode catalyst layer reaches the cathode-side electrode catalyst layer through a conductive carrier constituting the electrode catalyst layer, a gas diffusion layer contacting the opposite side of the electrode catalyst layer to the solid polymer electrolyte membrane, a separator, and an external circuit. Then, the proton and the electron, which have reached the cathode-side electrode catalyst layer, react with oxygen contained in an oxidant gas supplied to the cathode side, to produce water ($O_2 + 4H^+ + 4e^- \rightarrow 2H_2O$: Reaction 2). In the fuel cell, electricity can be taken out to the outside through the above-described electrochemical reaction.

In order to improve power generation performance, improvement in activity and durability (activity after a durability test) of a catalyst particle in the electrode catalyst layer is an important key. Conventionally, from the viewpoint of the improvement in the activity and durability, it has been necessary to use platinum as a catalyst component of electrode catalyst. However, since the platinum is very expensive and is also a rare metal as a resource, there has been a need to develop a platinum alloy-based catalyst by reducing a content of platinum occupied in the catalyst particle while maintaining activity or durability.

For example, Patent Literature 1 discloses a catalyst containing a platinum-metal alloy having a face-centered tetragonal structure and showing a broad peak or a peak having two split tips at a 2θ-value of about 65 to 75° in an XRD pattern of the platinum-metal alloy. According to Patent Literature 1, since the platinum-metal alloy having the face-centered tetragonal structure is stable in structure, the durability is excellent.

CITATION LIST

Patent Literature

Patent Literature 1: JP-A-2010-282947

SUMMARY OF INVENTION

Technical Problem

Although the platinum-metal alloy disclosed in Patent Literature 1 has a stable structure as an alloy, a metal other than platinum, which exists on the catalyst particle surface, is eluted under acidic conditions. Therefore, the catalyst disclosed in Patent Literature 1 is inferior in activity and durability.

Accordingly, the present invention has been made in view of the above circumstances, and an object thereof is to provide a catalyst particle which can exhibit high activity.

Another object of the present invention is to provide a catalyst particle which is excellent in durability.

Further another object of the present invention is to provide an electrode catalyst, an electrolyte membrane-electrode assembly, and a fuel cell which are obtained using the catalyst particle of the present invention.

Solution to Problem

In order to solve the above problems, the present inventors have intensively studied, to find that the above problems could be solved by a catalyst particle having an exposed crystal face of high activity and satisfying a specific relation between an area average particle diameter and a number average particle diameter.

That is, such a catalyst particle is an alloy particle formed of platinum atom and a non-platinum metal atom. The alloy particle has an extent of ordering of $L1_2$ structure in the range of 30 to 100% as an internal structure, an LP ratio calculated by CO stripping method of 10% or more, and a $d_N/d_A$ ratio in the range of 0.4 to 1.0.

BRIEF DESCRIPTION OF DRAWINGS

FIG. 1 is a cross-sectional view schematically illustrating a basic configuration of a polymer electrolyte fuel cell according to an embodiment of the present invention. In FIG. 1, reference numeral 1 represents a polymer electrolyte fuel cell (PEFC); reference numeral 2 represents a solid polymer electrolyte membrane; reference numeral 3 represents a catalyst layer; reference numeral 3a represents an anode catalyst layer; reference numeral 3c represents a cathode catalyst layer; reference numeral 4a represents an anode gas diffusion layer; reference numeral 4c represents a cathode gas diffusion layer; reference numeral 5a represents an anode separator; reference numeral 5c represents a cathode separator; reference numeral 6a represents an anode gas passage; reference numeral 6c represents a cathode gas passage; reference numeral 7 represents a coolant passage; and reference numeral 10 represents an electrolyte membrane-electrode assembly (MEA).

DESCRIPTION OF EMBODIMENTS

A catalyst particle(s) according to a preferred embodiment of the present invention is a catalyst particle(s) which is an alloy particle formed of platinum atom and a non-platinum metal atom, wherein (i) the alloy particle has an $L1_2$ structure as an internal structure and has an extent of ordering of $L1_2$ structure in the range of 30 to 100%, (ii) the alloy particle has an LP ratio calculated by CO stripping method of 10% or more, and (iii) the alloy particle has a $d_N/d_A$ ratio in the range of 0.4 to 1.0.

According to the above configuration, since the elution of a metal(s) other than the platinum is suppressed and numerous crystal faces of high activity are exposed, a catalyst particle having improved activity and high activity even after a durability test can be provided. In addition, according to the present invention, since a ratio ($d_N/d_A$) of a number average particle diameter ($d_N$) to an area it is possible to activity of a catalyst can be improved.

Furthermore, an electrode catalyst, an electrolyte membrane-electrode assembly, and a fuel cell which are obtained using such a catalyst particle can be provided.

In this specification, the meaning of "having an $L1_2$ structure as an internal structure" represents that an extent of ordering of an $L1_2$ structure exceeds 0%. In this specification, the "extent of ordering of $L1_2$ structure" represents a volume ratio (% by volume) of the $L1_2$ structure to the overall structure of the alloy particle(s). A higher extent of ordering means higher ordering property of an intermetallic compound (a larger volume ratio of the $L1_2$ structure). Moreover, in this specification, the "extent of ordering of $L1_2$ structure" is also simply referred to as an "extent of ordering".

(i) The catalyst particle(s) of the present invention has an extent of ordering of $L1_2$ structure in the range of 30 to 100%. By this feature, initial activity (activity before a durability test) can be increased, and activity after a durability test can be also improved.

The platinum-metal alloy constituting the catalyst disclosed in the Patent Literature 1 cannot exhibit sufficient activity, and continuous elution of the metal (for example, Co) forming the alloy with the platinum cannot be prevented, to deteriorate durability. On the other hand, the alloy particle (s) according to the present invention has high activity and is also excellent in durability (has high activity even after a durability test). Although the reasons why the above effects can be achieved are unclear, it would be assumed as follows. Incidentally, the present invention should not be limited by the following assumption.

Specifically, the platinum-metal alloy constituting the catalyst disclosed in the Patent Literature 1 has a face-centered tetragonal structure and shows a broad peak or a peak having two split tips at a 2θ-value of about 65 to 75° in an XRD pattern using a CuKα line. Accordingly, the platinum-metal alloy disclosed in the Patent Literature 1 is an intermetallic compound having an $L1_0$ structure. The intermetallic compound having the $L1_0$ structure is stable in terms of an alloy. However, since the platinum-metal alloy has a repeated structure of a platinum layer and a metal layer, it is inferior in structural stability compared to an intermetallic compound having an $L1_2$ structure. In addition, since the platinum-metal alloy disclosed in the Patent Literature 1 has a structure in which the metal (for example, Co) other than the platinum exists on the surface of the catalyst particle and has a repeated structure of a platinum metal atomic layer and a non-platinum metal atomic layer, a continuous elution of the metal cannot be sufficiently suppressed under acidic conditions, for example, under a strongly acidic electrolyte (for example, an electrolyte such as perfluorosulfonic acid which has been commonly used in PEFC), to cause the elution of metal. Therefore, the catalyst disclosed in the Patent Literature 1 is inferior in activity and durability.

In contrast, the alloy particle(s) according to the present invention has an $L1_2$ structure as the internal structure, and has an extent of ordering of $L1_2$ structure in the range of 30 to 100%. The $L1_2$ structure forms an ordering structure in which only one of four auxiliary lattices (α (000), β (½ ½ 0), γ (½ 0 ½), and δ (0 ½ ½)) of an fcc structure differs and a composition ratio is 3:1. In addition, an atomic arrangement of the $L1_2$ structure has cubic symmetry. In the alloy (catalyst) particle having such a structure, non-platinum metal atoms are not coordinated to each other, and the catalyst particle surface is substantially covered with platinum atoms (a skin layer of platinum metal atoms is formed). In the alloy particle(s) according to the present invention, even when a surface is not partially covered with the platinum atoms, since the non-platinum metal atoms are not coordinated to each other, a coordinated platinum atom stops additional elution of the non-platinum metal atoms even when the non-platinum metal atoms in the vicinity of the surface are eluted under acidic conditions, and the skin layer of the platinum metal atoms is formed on the surface of the alloy particle. Accordingly, the catalyst particle(s) has higher resistance to elution and can suppress and prevent continuous elution of non-platinum metal even under acidic conditions, for example, in a state of contacting with a strongly acidic electrolyte (for example, an electrolyte such as perfluorosulfonic acid which has been commonly used in PEFC). Therefore, the catalyst particle(s) of the present invention can exhibit effects by the non-platinum metal atom(s) over a long period.

(ii) Moreover, the alloy particle(s) according to the present invention has an LP ratio calculated by CO stripping method (in this specification, simply also referred to as an "LP ratio") of 10% or more. By this feature, a platinum alloy-based catalyst having improved activity of an electrode catalyst and also having a reduced content of platinum in a catalyst particle can be provided. A mechanism of achieving the effect is not clear, but it is considered as follows. Specifically, when the LP ratio is 10% or more, since numerous crystal faces of high activity are exposed, activity (mass specific activity and area specific activity; in particular, area specific activity) can be improved. That is, since numerous crystal faces of high activity are exposed, a platinum alloy-based catalyst having improved activity of an electrode catalyst and also having a reduced content of platinum in a catalyst particle can be provided.

Accordingly, the catalyst particle of the present invention can exhibit the high activity (mass specific activity and area specific activity; in particular, area specific activity) even when a content of platinum is small. In addition, the catalyst particle of the present invention is also excellent in durability (having high activity even after a durability test). Therefore, an electrode catalyst using the catalyst particle of the present invention and an electrolyte membrane-electrode assembly and a fuel cell having a catalyst layer provided with the electrode catalyst are excellent in power generation performance.

(iii) Moreover, according to the present invention, since the ratio ($d_N/d_A$) of the number average particle diameter ($d_N$) to the area average particle diameter ($d_A$) is appropriate (0.4 to 1.0), activity (mass specific activity and area specific activity; in particular, mass specific activity) of the catalyst can be improved. Hereinafter, the ratio ($d_N/d_A$) of the number average particle diameter ($d_N$) to the area average particle diameter ($d_A$) is also simply referred to as a "$d_N/d_A$ ratio".

By this feature, the catalyst particle can exhibit high activity (mass specific activity and area specific activity; in particular, mass specific activity). A mechanism of achieving the effect is not clear, but it is considered as follows. The present invention should not be limited to the following mechanism. Specifically, an alloy particle having a $d_N/d_A$ ratio of 0.4 or more has a small distribution width. Thus, a specific surface area of the catalyst particle becomes larger, to improve activity (mass specific activity and area specific activity; in particular, mass specific activity).

Furthermore, in the alloy (catalyst) particle(s) having the above structure, non-platinum metal atoms are not coordinated to each other due to its $L1_2$ structure, and the catalyst particle surface is substantially covered with platinum atoms (a skin layer of platinum metal atoms is formed). In the alloy particle(s) according to the present invention, since the non-platinum metal atoms are not coordinated to each other, a coordinated platinum atom stops additional elution of the non-platinum metal atoms even when the non-platinum metal atoms in the vicinity of the surface are eluted under acidic conditions, and the skin layer of the platinum metal atoms is formed on the surface of the alloy particle. Accordingly, the catalyst particle(s) has higher resistance to elution and can suppress and prevent continuous elution of non-platinum metal even under acidic conditions, for example, in a state of contacting with a strongly acidic electrolyte (for example, an electrolyte such as perfluorosulfonic acid which has been commonly used in PEFC). Therefore, the catalyst particle(s) of the present invention can exhibit effects by the non-platinum metal atom(s) over a long period.

As described above, the catalyst particle(s) of the present invention can exhibit high activity (mass specific activity and area specific activity) even with a small content of platinum. Also, the catalyst particle of the present invention is excellent in durability (manifests high activity even after a durability test). In addition, when the electrode catalyst is obtained by supporting the catalyst particle of the present invention on a conductive carrier, the alloy particles are monodispersed on the carrier without being agglomerated at a predetermined ratio or more. Accordingly, an electrode catalyst using the catalyst particle(s) of the present invention and an electrolyte membrane-electrode assembly and a fuel cell having a catalyst layer provided with the electrode catalyst have excellent power generation performance.

Hereinafter, an embodiment of a catalyst particle according to the present invention and an embodiment of an electrode, an electrolyte membrane-electrode assembly (MEA), and a fuel cell using such a catalyst particle will be described in detail appropriately with reference to the drawings. However, the present invention is not limited to the following embodiments. In addition, each of the drawings may be expressed in an exaggerated manner for the convenience of description, and in each of the drawings, scaling factors of components may be different from actual values thereof. In addition, in the description of the embodiments of the present invention with reference to the drawings, the same components are denoted by the same reference numerals, and redundant description is omitted.

In this description, "X to Y" representing a range denotes "X or more and Y or less", and "weight" and "mass", "wt %" and "mass %", "parts by weight", and "parts by mass" are used interchangeably. Unless otherwise noted, operation and the measurement of physical properties are performed at a room temperature (20 to 25° C.) and a relative humidity of 40 to 50%.

[Fuel Cell]

A fuel cell comprises an electrolyte membrane-electrode assembly (MEA) and a pair of separators including an anode-side separator having a fuel gas passage through which a fuel gas flows and a cathode-side separator having an oxidant gas passage through which an oxidant gas flows. The fuel cell according to the present invention has excellent durability and can exhibit a high power generation performance.

FIG. 1 is a schematic diagram illustrating a basic configuration of a polymer electrolyte fuel cell (PEFC) 1 according to an embodiment of the present invention. First, a PEFC 1 is configured to comprise a solid polymer electrolyte membrane 2 and a pair of catalyst layers (anode catalyst layer 3a and cathode catalyst layer 3c) interposing the solid polymer electrolyte membrane 2. A stacked body of the solid polymer electrolyte membrane 2 and the catalyst layers (3a, 3c) is sandwiched by a pair of gas diffusion layers (GDLs) (anode gas diffusion layer 4a and cathode gas diffusion layer 4c). In this manner, the solid polymer electrolyte membrane 2, a pair of the catalyst layers (3a, 3c), and a pair of gas diffusion layers (4a, 4c) in the stacked state constitute an electrolyte membrane-electrode assembly (MEA) 10.

In the PEFC 1, the MEA 10 is sandwiched by a pair of separators (anode separator 5a and cathode separator 5c). In FIG. 1, the separators (5a, 5c) are illustrated to be positioned at two ends of the MEA 10 illustrated. In general, in a fuel cell stack where a plurality of MEAs are stacked, the separator is also used as a separator for adjacent PEFC (not shown). In other words, MEAs in a fuel cell stack are sequentially stacked through the separator to constitute the stack. In an actual fuel cell stack, a gas sealing member is disposed between the separators (5a, 5c) and the solid polymer electrolyte membrane 2 and between the PEFC 1 and a different PEFC adjacent thereto. However, it is omitted in FIG. 1.

The separators (5a, 5c) are obtained by applying a pressing process to a thin board having a thickness of, for example, 0.5 mm or less to form a corrugating shape illustrated in FIG. 1. Convex portions of the separators 5a and 5c seen from the MEA side are in contact with the MEA 10. This secures an electrical connection with the MEA 10. Concave portions (spaces between the separator and the MEA formed by the corrugating shapes of the separators) of the separators (5a and 5c) seen from the MEA side function as a gas passage for passing a gas during the operation of the PEFC 1. Specifically, a fuel gas (for example, hydrogen) flows through a gas passage 6a of the anode separator 5a, and an oxidant gas (for example, air) flows through a gas passage 6c of the cathode separator 5c.

On the other hand, concave portions of the separators (5a, 5c) seen from the side opposite to the MEA side function as a coolant passage 7 for passing a coolant (e.g. water) for cooling the PEFC during the operation of the PEFC 1. In addition, manifolds (not shown) are typically installed in the separators. The manifold functions as a connecting means for connecting cells when the stack is configured. According to the configuration, a mechanical strength of the fuel cell stack can be secured.

In the embodiment illustrated in FIG. 1, each of the separators (5a, 5c) is formed in a corrugating shape. However, the separator is not limited to such a corrugating shape. If it can serve as a gas passage and a coolant passage, arbitrary shape such as a flat shape and a partially corrugating shape may be employed.

The fuel cell including the MEA according to the present invention as described above has excellent performance of power generation. Herein, the type of the fuel cell is not particularly limited. In the above description, the polymer electrolyte fuel cell is exemplified, but besides, an alkali fuel cell, a direct methanol fuel cell, a micro fuel cell, and the like may be exemplified. Among the fuel cells, due to a small size and capability of obtaining high density and high power, a polymer electrolyte fuel cell (PEFC) is preferred. In addition, the fuel cell is useful as a power source for energy storage system besides a power source for a vehicle such as a car where a mounting space is limited. Among the power sources, the fuel cell is particularly preferably used as a power source for a vehicle such as a car where a high output voltage is required after the stopping of operation for a relatively long time.

A fuel used for operating the fuel cell is not particularly limited. For example, hydrogen, methanol, ethanol, 1-propanol, 2-propanol, 1-butanol, secondary butanol, tertiary butanol, dimethyl ether, diethyl ether, ethylene glycol, diethylene glycol, or the like can be used. Among them, in view of capability of high output, hydrogen or methanol is preferably used.

In addition, although application use of the fuel cell is not particularly limited, the fuel cell is preferably applied to vehicles. The electrolyte membrane-electrode assembly according to the present invention has excellent power generation performance and durability, and can be downsized. Therefore, in terms of mountability on a vehicle, the fuel cell according to the present invention is particularly advantageous in the case where the fuel cell is applied to a vehicle.

Hereinafter, members constituting the fuel cell according to the present invention will be described in brief, but the scope of the present invention is not limited only to the following forms.

[A Catalyst Particle(s)]

The catalyst particle(s) of the present invention is an alloy particle(s) formed of platinum atom and a non-platinum metal atom(s). In general, an alloy is obtained by mixing a metal element with at least one metal element or non-metal element, and is a general term for substances having metallic properties. The structure of the catalyst particle includes an eutectic alloy which is a mixture where component elements form separate crystals, an alloy where component elements are completely fused to form a solid solution, an alloy where component elements form a intermetallic compound or a compound between a metal and a non-metal. In the present invention, the catalyst particle may have any of these structures, but include at least an intermetallic compound formed by a platinum atom and non-platinum atom(s).

In addition, the alloy particle according to the present invention has an $L1_2$ structure as an internal structure. The expression of "having the $L1_2$ structure" represents that an extent of ordering of the $L1_2$ structure exceeds 0%. The catalyst particle satisfying the above configuration can exhibit high activity and durability even with a small content of platinum.

The alloy particle according to the present invention has an $L1_2$ structure as an internal structure and has an extent of ordering of the $L1_2$ structure in the range of 30 to 100%. The catalyst particle satisfying the above configuration can exhibit high activity and durability even with a small content of platinum. The extent of ordering of the $L1_2$ structure is preferably in the range of 40 to 100%, more preferably in the range of 45 to 100%, further more preferably in the range of 47 to 95%, and particularly preferably in the range of 50 to 90%. Thereby, since the particle has a structure in which atoms are regularly arrayed at a ratio more than a prescribed level, the activity can be further improved, and activity and durability (activity after a durability test) of the catalyst particle can be further improved.

The "extent of ordering (%) of the $L1_2$ structure" as used herein can be determined based on a method disclosed in J. Mater. Chem., 2004, 14, 1454-1460, and is defined as a ratio between a peak area (Ia) of maximum intensity and a peak area (Ib) specific to the intermetallic compound in an X-ray diffraction (XRD) pattern. Specifically, the "extent of ordering (%) of the $L1_2$ structure" is a value measured according to the following method.

<Method of Measuring Extent of Ordering of $L1_2$ Structure>

The catalyst particle (s) is subjected to X-ray diffraction (XRD) under the following conditions, to obtain an XRD pattern. In the resulting XRD pattern, a peak area (Ia) observed at a 2θ value in the range of 39 to 41° and a peak area (Ib) observed at a 2θ value in the range of 31 to 34° are measured. The peak observed at a 2θ value in the range of 39 to 41° corresponds to a specific peak for a lattice plane of platinum. The peak observed at a 2θ value in the range of 39 to 41° corresponds to a peak indicating an entire structure of the alloy particle. In addition, a peak observed at a 2θ value in the range of 31 to 34° corresponds to a specific peak for an $L1_2$ structure of the alloy particle.

[Table 1]
X(-Ray Diffraction Conditions)
X-ray diffraction measurement apparatus: Smart-Lab manufactured by Rigaku Corporation (using a graphite monochrometer for a detector)
X-ray: CuKα-ray
Scanning rate: 3°/min.
Operating voltage: 45 kV
Operating current: 200 mA The extent of ordering of the $L1_2$ structure is calculated using the peak areas Ia and Ib by the following Formula (1).

[Mathematical Formula 1]

$$\text{Extent of ordering (\%)} = \left[\frac{(Ib/Ia)^{0.5}}{X}\right] \times 100 \qquad \text{Expression (1)}$$

In Formula (1), X is a specific value for a non-platinum metal atoms constituting the alloy particle. Specifically, the X is a value indicated in the following table.

TABLE 2

| | Non-platinum metal atoms | | | | | | |
|---|---|---|---|---|---|---|---|
| | V | Cr | Mn | Fe | Co | Cu | Zn | Zr |
| X | 0.14 | 0.13 | 0.13 | 0.13 | 0.13 | 0.13 | 0.10 | 0.06 |

The non-platinum metal atom(s) is not particularly limited, but are preferably a transition metal atom in view of catalytic activity, easy formation of an $L1_2$ structure, and the like. As used herein, the transition metal atom refers to an element from Group III to Group XII, and a kind of the transition metal atom is also not particularly limited. In view of catalytic activity and easy formation of $L1_2$ structure, the transition metal atom is preferably selected from the group consisting of vanadium (V), chromium (Cr), manganese (Mn), iron (Fe), cobalt (Co), copper (Cu), zinc (Zn), and zirconium (Zr). Above all, cobalt (Co) is preferred. Thus, when the transition metal contains a metal atom capable of forming an intermetallic compound with platinum (Pt), activity can be increased. Since the transition metal atom can easily form an intermetallic compound with the platinum (Pt), mass specific activity (activity per mass area) can be further improved while reducing an amount of platinum to be used. In addition, the alloy between the transition metal atom and the platinum can achieve higher area specific activity (activity per unit area) and durability (activity after durability test). With respect to the transition metal atom(s), an individual atom may be alloyed with the platinum or two or more kinds of atoms may be alloyed with the platinum.

In addition, an LP ratio calculated by CO stripping method in the alloy particle according to the present invention is 10% or more. More specifically, the LP ratio is preferably 12% or more, and more preferably 15% or more. In particular, when the LP ratio is 15% or more, since it is assumed that many crystal faces having high activity (mass specific activity and area specific activity, in particular, area specific activity) are exposed, higher area specific activity can be early realized at an initial stage. The upper limit is not limited, but it is expected to be approximately 70% in practice.

An LP ratio in the present invention calculated by CO stripping method can be calculated as follows.
<Method of Measuring LP Ratio Calculated by CO Stripping Method>

A catalyst is held at an electrode potential of 0.05 V (vs. RHE) for 30 minutes in 0.1 M of perchloric acid solution (25° C.) saturated with CO, to adsorb CO onto the surface of the catalyst. Then, the CO in the solution is replaced with an inert gas such as nitrogen while the electrode potential is maintained at 0.05 V. When the replacement is completed, the potential is swept from 0.05 V to 1.2 V at a scanning rate of 20 mV $S^{-1}$. In a stripping wave due to oxidation of CO to be observed at this time, a peak area of a peak which appears at a low potential side (specifically, 0.55 to 0.75 V) is separated is measured. A value obtained by a division of the peak area with an overall peak area of the stripping wave is defined as the LP ratio. The value is also calculated in a similar manner in Examples to be described below.

Although it is difficult to obtain average information of a crystal face exposed with numerous nano fine particles, a peak at a low potential side (0.55 to 0.75 V) in the CO stripping method according to the present invention is assumed to be derived from at least one of a crystal face (110), edge, and step of an alloy particle. However, needless to say, the scope of the present invention is not limited to such an assumption.

Cost reduction is one of major challenges for practical use of FCEV as described above, and there is another challenge that an amount of platinum to be used is reduced by improving activity of an electrode catalyst. For these challenges, since the electrode catalyst produced using the catalyst particle of the present invention has a structure in which the activity surface is exposed at a certain level or more, the electrode catalyst of the present invention has activity higher than that of a conventional platinum-based catalyst.

In addition, the catalyst particle of the present invention has a ratio ($d_N/d_A$) of a number average particle diameter ($d_N$) to an area average particle diameter ($d_A$) of the alloy particle in the range of 0.4 to 1.0. When the $d_N/d_A$ ratio of the alloy particle is in the range described above, a specific surface area of the catalyst particle increases, so that the mass specific activity can be improved. In view of further improved mass specific activity of the catalyst particle, the $d_N/d_A$ ratio of the alloy particle is preferably in the range of 0.45 to 1.0, and more preferably in the range of 0.5 to 1.0.

In this specification, the area average particle diameter ($d_A$) and the number average particle diameter ($d_N$) of the alloy particle are measured as follows. First, n pieces of alloy particles are observed by a transmission electron microscope (TEM), and a particle diameter (d) of each alloy particle is measured by back-calculating a particle diameter (equivalent circle diameter) when an area is regarded as a perfect circle based on a projected area of each particle. Using the particle diameter (d) of each alloy particle thus obtained, the number average particle diameter ($d_N$) and the area average particle diameter ($d_A$) of the alloy particle are calculated by the following Formulas (A) and (B), respectively. The number (n) of alloy particles to be measured is not particularly limited, but is preferably a number with no statistically significant difference. For example, it is preferably at least 200 pieces and more preferably at least 300 pieces.

In this specification, in calculating the number average particle diameter ($d_N$) and the area average particle diameter ($d_A$) of the alloy particle, the number of alloy particle samples "n" is 300 or more.

[Mathematical Formula 2]

$$d_N = \frac{\sum d}{n} \quad \text{Formula (A)}$$

$$d_A = \frac{\sum d^3}{\sum d^2} \quad \text{Formula (B)}$$

In addition, the number average particle diameter ($d_N$) of the alloy particle calculated as described above is divided by the area average particle diameter ($d_A$), to obtain a ratio ($d_N/d_A$ ratio) of the number average particle diameter ($d_N$) to the area average particle diameter ($d_A$) of the alloy particle.

A composition of catalyst particle is also not particularly limited. In view of catalytic activity, easy control of $d_N/d_A$ ratio, and easy formation of $L1_2$ structure, for the composition of the catalyst particle, a content of platinum atom is preferably in the range of 1.5 to 15 moles, more preferably in the range of 1.6 to 10 moles, further more preferably in the range of 1.7 to 7 moles, and particularly preferably in the range of 2.2 to 6 moles, relative to 1 mole of a non-platinum metal atom. When the catalyst particle has such a composition, the catalyst particle has a $L1_2$ structure serving as an internal structure which is sufficiently high in extent of ordering, and can exhibit and maintain high activity. The composition of the catalyst particle (content of each metal atom in the catalyst particle) can be determined according to the conventionally known methods such as ICP atomic emission spectrometry) or ICP mass spectrometry, and X-ray fluorescene analysis (XRF).

A size of catalyst particle is not particularly limited. For example, the number average particle diameter ($d_N$) of the catalyst particle is preferably in this order of 20 nm or less, 15 nm or less, 10 nm or less, 9 nm or less, 8 nm or less, 7.5 nm or less, and 7 nm or less. The lower limit of the number average particle diameter ($d_N$) of the catalyst particle is not particularly limited, but is preferably 1 nm or more, more preferably 2 nm or more, and particularly preferably 3 nm or more.

Moreover, the area average particle diameter ($d_A$) of the catalyst particle is not particularly limited as long as the $d_N/d_A$ ratio is in a predetermined range, but is preferably in this order of 20 nm or less and 15 nm or less.

The lower limit of the area average particle diameter ($d_A$) of the catalyst particle is not particularly limited, but is preferably 1 nm or more, more preferably 2 nm or more, further more preferably more than 3 nm, and particularly preferably 5 nm or more. When the particle diameters of the catalyst particle (number average particle diameter and area average particle diameter) are within such a range, dissolution and agglomeration of catalyst metals during power generation can be suppressed while increasing activity per unit catalyst metal amount (mass specific activity and area specific activity; in particular, mass specific activity).

In addition, the alloy (catalyst) particle(s) preferably consists of a core portion containing the platinum atom and the non-platinum metal atom and a skin layer which cover the core portion and is formed of the platinum atom. Such a configuration includes both a structure where the surface of the catalyst particle is substantially covered with the skin layer of the platinum atom during production (before activation) and a structure where the skin layer of the platinum atom is formed on the surface of the catalyst particle with the elapse of time during the use thereof. The structure is determined by the extent of ordering of the alloy particle, for example. In the former structure, the alloy particle is configured such that the surface of the catalyst particle is substantially covered with the skin layer formed of the platinum atom during the production (before the activation). Further, in the latter structure, the alloy particle has a region where the skin layer formed of the platinum atom is not provided on the surface. However, the alloy particle has an $L1_2$ structure as an internal structure in which n non-platinum metal atoms are not coordinated to each other, and the extent of ordering of the $L1_2$ structure is in the range of 30 to 100%. Accordingly, even when the skin layer is not present on the surface of the catalyst particle during the production (before the activation), the non-platinum metal atoms in the vicinity of the surface of the catalyst particle is eluted under acidic conditions during the use (activation). On the other hand, since the platinum atom coordinated to the non-platinum metal atom stops additional elution of non-metal metal atom, the skin layer of the platinum metal atom is formed on the surface of the alloy particle. Therefore, the alloy (catalyst) particle(s) of the present invention has high resistance to elution and can suppress and prevent the chain elution of the non-platinum metal even under acidic conditions, for example, in a state of contacting a strongly acidic electrolyte (for example, an electrolyte such as perfluorosulfonic acid which has been commonly used in PEFC). That is, according to the above configuration, the alloy (catalyst) particles is configured such that the skin layer of the platinum atom having high resistance to elution covers a core portion including the non-platinum metal atoms having poor resistance to elution. Therefore, the elution of the non-platinum metal can be suppressed and prevented under potential cycle environment or acidic conditions, and thus the catalyst particle can maintain its activity (area specific activity, mass specific activity) for a long period. Thus, the catalyst particle of the present invention can exhibit effects of the non-platinum metal over a long period.

The skin layer may coat at least a portion of the alloy (catalyst) particle, but is preferable to coat the entire surface of the catalyst particle in consideration of improvement in suppression and prevention effects of elution of non-platinum metal. In addition, a platinum atom layer which forms the skin layer may be a single layer or platinum atom layers may be stacked. The skin layer is preferably configured by six platinum atomic layers (exceeding zero layer), preferably configured by 1 to 5 platinum atomic layers, and more preferably configured by 1 to 3 platinum atomic layers. With such a number, it is possible to sufficiently suppress and prevent the elution of non-platinum metal under a potential cycle environment or acidic conditions. In addition, since the non-platinum metal is located in the vicinity of the surface of the catalyst particle, the catalyst particle can sufficiently exhibit effects by the non-platinum metal, and thus can exhibit high activity. As described above, the skin layer may be formed after the production of the catalyst particle, and may be formed with the lapse of time. For example, since the catalyst particle(s) is placed in an acidic environment under operating conditions of the fuel cell, the skin layer may be formed with the lapse of time.

The number of platinum atomic layers constituting the skin layer of the catalyst particle (alloy particle) can be measured according to well-known methods. For example, energy dispersive X-ray spectroscopy (EDX) can be used which detects a characteristic X-ray specific to each element to be generated by irradiation with electron beam and performs element analysis or composition analysis by energy spectrum. In this specification, the number of platinum atomic layers constituting the skin layer of the catalyst particle (alloy particle) is measured by STEM-EDX analysis. To be more specific, characteristic X-rays specific to the platinum metallic element and the non-platinum metallic element constituting the catalyst particle are detected from the surface of the catalyst particle toward the center thereof using STEM-EDX analyzer (manufactured by Hitachi High Technologies Corporation, Trade name: HD-2700), to measure intensity. A thickness when the characteristic X-ray specific to the non-platinum metallic element is first detected is a thickness (nm) of the skin layer. A value obtained by dividing the thickness of the skin layer by an atomic diameter (0.27 nm) of the platinum is defined as the number of platinum atomic layers constituting the skin layer of the catalyst particle (alloy particle). For example, when a cobalt element is first detected at a point of 0.68 nm from the surface by STEM-EDX analysis of platinum-cobalt alloy particle, the number of platinum atomic layers is about 2.5 (=0.68/0.27) layers. In this specification, the number of platinum atomic layers is measured according to the above method with respect to five or more catalyst particles, to obtain an average value. The average value is referred as the "number of platinum atomic layers constituting the skin layer of the catalyst particle (alloy particle)".

[Catalyst (Electrode Catalyst)]

The catalyst particle is appropriately supported on a conductive carrier to form an electrode catalyst. That is, the present invention also provides the catalyst particle of the present invention and an electrode catalyst having the catalyst particle supported a conductive carrier. The electrode catalyst of the present invention can exhibit and maintain high activity even with a small platinum content.

The conductive carrier functions as a carrier for supporting the catalyst particle and as an electron conduction path that is involved in transferring electrons between the catalyst particle and another member. The conductive carrier is not particularly limited as long as the conductive carrier has a specific surface area for supporting the catalyst particle in a desired dispersion state and has sufficient electron conductivity as a collector, and a main component of the conductive carrier is preferably carbon. As used herein, the phrase "a main component is carbon" means that carbon atoms are contained as a main component, and includes both cases that it consists of only a carbon atom and that it consists substantially of carbon atom. In some cases, an element other than carbon atom may be contained to improve characteristics of a fuel cell. As used herein, the phrase "consists substantially of carbon atom" denotes that impurities of about 2 to 3 wt % or less can be contaminated.

Specific examples of the conductive carrier may include carbon black, such as acetylene black, channel black, oil furnace black, gas furnace black (for example, Vulcan), lamp black, thermal black, and Ketjen black (registered trademark); black pearl; graphitized acetylene black; graphitized channel black; graphitized oil furnace black; graphitized gas furnace black; graphitized lamp black; graphitized thermal black; graphitized Ketjen black; graphitized black pearl; carbon nanotube; carbon nanofiber; carbon nanohorn; carbon fibril; activated carbon; coke; natural graphite; and synthetic graphite. In addition, an example of the conductive carrier may include zeolite template carbon (ZTC) having a structure in which nano-sized belt-like graphenes are regularly coupled to one another in a three-dimensional shape.

A BET specific surface area of the conductive carrier may be a specific surface area sufficient to highly disperse and support the catalyst particle thereon, but is preferably in the range of 10 to 5000 $m^2/g$, and more preferably in the range of 50 to 2000 $m^2/g$. When the conductive carrier has the specific surface area within such a range, a sufficient amount of catalyst particles can be supported (highly dispersed) on the conductive carrier, to achieve sufficient power generation performance. The "BET specific surface area ($m^2/g$ support)" of the carrier is measured by a nitrogen adsorption method.

A size of the conductive carrier is not particularly limited. From a viewpoint of easy supporting, utilization rate of catalyst, and ability to control a thickness of electrode catalyst layer within an adequate range, an average particle diameter may be in the range of 5 to 200 nm, and preferably in the range of 10 to 100 nm. The "average particle diameter of the carrier" can be measured as an average value of a crystallite diameter obtained from a half-value width of a diffraction peak of the carrier particles in the X-ray diffraction (XRD) or as an average value of a particle size of carrier examined from a transmission electron microscope (TEM). In this specification, the "average particle diameter of the carrier" is an average value of particle diameters of carrier particles to be examined by the transmission electron microscope image with respect to the number of samples which is statistically significant (for example, at least 200, and preferably at least 300). The "particle diameter" denotes a maximum distance between any two points on a contour line of the particle.

In the electrode catalyst obtained having the catalyst particle supported on the conductive carrier, the supported concentration (supported amount) of the catalyst particle is not particularly limited, but is preferably in the range of 2 to 70 wt % with respect to the total amount of the carrier. When the supported concentration is within this range, the agglomeration between the catalyst particles can be suppressed and the increase in thickness of the electrode catalyst layer can be suppressed, which would be preferred. The supported concentration of the catalyst particle is more preferably in the range of 5 to 60 wt %, and further more preferably in the range of 5 wt % over but 50 wt % or less. In addition, from the viewpoint of mass specific activity, the supported concentration of the catalyst particle is preferably in the range of 10 to 45 wt %.

When the supported amount of the catalyst component is within this range, balance between a dispersion degree of catalyst component on the catalyst carrier and the catalyst performance can be appropriately controlled. The supported amount of the catalyst component can be examined according to a conventionally well-known method such as ICP atomic emission spectrometry, ICP mass spectrometry, or X-ray fluorescene analysis (XRF).

[Method of Producing Catalyst Particle/Catalyst (Electrode Catalyst)]

A method of producing the catalyst particle is not particularly limited as long as a catalyst particle which is an alloy particle formed of platinum atom and a non-platinum metal atom, wherein (i) the alloy particle has an $L1_2$ structure as an internal structure and has an extent of ordering of $L1_2$ structure in the range of 30 to 100%, (ii) the alloy particle has an LP ratio calculated by CO stripping method of 10% or more, and (iii) the alloy particle has a $d_N/d_A$ ratio in the range of 0.4 to 1.0.

In a preferred embodiment, the method of producing the catalyst particle includes: (1) a process of preparing a mixed solution containing a platinum precursor and a non-platinum metal precursor; (2) a process of adding a reducing agent to the mixed solution, and reducing the platinum precursor and the non-platinum metal precursor simultaneously, thereby obtaining a catalyst precursor particle-containing liquid; (3) a process of adding a carbon carrier to the catalyst precursor particle-containing liquid, thereby obtaining a catalyst precursor particle-supported carrier, the carbon carrier having at least one or more functional groups selected from the group consisting of a lactone group, a hydroxyl group, an ether group, and a carbonyl group formed on the surface thereof in a total amount of 0.5 µmol/$m^2$ or more; and (4) a process of subjecting the catalyst precursor particle-supported carrier to heat-treatment.

The method is a method of producing an electrode catalyst (particularly, electrode catalyst for full cell) having the catalyst particle of the present invention supported on the conductive carrier, but the electrode catalyst of the present invention can be produced by appropriate modifying the method.

A preferred method will be described in detail below. However, the present invention is not limited to the following method.

(Process (1))

In this process, a mixed solution containing a platinum precursor and a non-platinum metal precursor is prepared.

The platinum precursor which can be used in this process (1) is not particularly limited, but platinum salts and platinum complexes can be used. More specifically, examples of the platinum precursor which can be used include chloroplatinic acid (typically, chloroplatinic acid hexahydrate; $H_2[PtCl_6] \cdot 6H_2O$), nitrate such as dinitrodiammine platinum, sulphates, ammonium salts, amines, ammine salts such as tetraammine platinum and hexaammine platinum, carbonates, bicarbonates, halides such as platinum chloride, nitrites, inorganic salts such as oxalate, carboxylates such as formate, and hydroxides, alkoxides. The platinum precursor may be used alone or in combination of two or more thereof.

In addition, the non-platinum metal precursor which can be used in this process (1) is not particularly limited, but non-platinum metal salts and non-platinum metal complexes can be used. More specifically, examples of the non-platinum metal precursor which can be used include nitrates, sulphates, ammonium salts, amines, carbonates, bicarbonates, halides such as bromide and chloride, nitrites, inorganic salts such as oxalate, carboxylates such as formate, hydroxides, alkoxides, and oxides, of the non-platinum metal. That is, a compound in which the non-platinum metal can become a metal ion in a solvent such as pure water can be preferably used. Among them, as a salt of the non-platinum metal, halides (in particular, chloride), sulphates, or nitrates are more preferable. The non-platinum metal precursor may be used alone or in combination of two or more thereof. Furthermore, the non-platinum metal precursor may be in the form of a hydrate.

A solvent used in the preparation of the mixed solution containing the platinum precursor and the non-platinum metal precursor is not particularly limited, and is appropriately selected depending on the kind of the platinum precursor or the non-platinum metal precursor to be used. A form of the mixed solution is not particularly limited, and includes a solution, a dispersion, and a suspension. From the viewpoint of uniform mixing, the mixed solution is preferably in the form of a solution. Specifically, examples of the solvent include water, an organic solvent such as methanol, ethanol, 1-propanol, 2-propanol, an acid, and an alkaline. Among them, from the viewpoint of sufficiently dissolving an ion compound of the platinum/non-platinum metal, water is preferably used, and pure water or ultrapure water is particularly preferably used. The solvent may be used alone or in combination of two or more thereof.

A concentration of the platinum precursor and the non-platinum metal precursor in the mixed solution is not particularly limited, but is preferably in the range of 0.1 to 50 (mg/100 mL), and more preferably in the range of 0.5 to 45 (mg/100 mL), in terms of metal. The concentration of the platinum precursor and the non-platinum metal precursor in the mixed solution may be the same or different.

A mixing ratio between the platinum precursor and the non-platinum metal precursor is not particularly limited, but is preferably a mixing ratio by which the alloy composition described above can be achieved. Specifically, the non-platinum metal precursor is preferably mixed with 1 mol of the platinum precursor in a ratio (in terms of metal) of 0.4 to 20 moles, more preferably in a ratio of 0.4 to 18 moles, and particularly preferably in a ratio of 0.5 to 15 moles.

With such a mixing ratio, a $L1_2$ structure can be successfully formed by appropriately controlling a ratio between the platinum atom and the non-platinum metal atoms of the catalyst particle (alternatively, controlling a ratio of platinum atom in the range of 1.5 to 15 moles with respect to 1 mol of the non-platinum metal atoms). The supported concentration of the catalyst particle supported on the support to be finally prepared can be adjusted depending on the amounts of the platinum precursor and the non-platinum metal precursor. However, even when the catalyst particle is prepared in the same manner prior to heat-treatment, the supported concentrations are slightly different from each other in some cases when conditions of the heat-treatment are different.

In the process (1), a method of preparing the mixed solution containing the platinum precursor and the non-platinum metal precursor is not particularly limited. For example, a method of adding a platinum precursor and a non-platinum metal precursor to a solvent; a method of dissolving a platinum precursor in a solvent and then adding a non-platinum metal precursor to the resulting solution; a method of dissolving a non-platinum metal precursor in a solvent, and then adding a platinum precursor to the resulting solution; and a method of separately dissolving a platinum precursor and a non-platinum metal precursor in a solvent, and mixing the resulting solutions with each other may be used. The mixed solution is preferably stirred so as to be uniformly mixed. Stirring conditions are not particularly limited as long as the uniform mixing can be achieved. For example, the mixed solution can be uniformly dispersed and mixed by using a suitable stirring machine such as a stirrer and a homogenizer, or an ultrasonic dispersing apparatus which is configured to apply ultrasonic waves. Furthermore, a stirring temperature is preferably in the range of 0 to 50° C., and more preferably in the range of 5 to 40° C. In addition, a stirring time may be appropriately set to perform sufficient dispersion. Typically, the stirring time is in the range of 1 to 60 minutes, and preferably in the range of 5 to 40 minutes.

(Process (2))

In this process, a reducing agent is added to the mixed solution prepared in the above process (1), to obtain a catalyst precursor particle-containing liquid (mixed particles of platinum/non-platinum metal). By this process, platinum ions derived from the platinum precursor and non-platinum metal ions derived from the non-platinum precursor can be reduced at the same time, to obtain a catalyst precursor particle(s) (intermetallic compound between the platinum and the non-platinum metal).

By reducing and precipitating the platinum and the non-platinum metal simultaneously, it is possible to obtain a desired product in a state where the platinum and the non-platinum metal are uniformly mixed with each other. In addition, by controlling the initial ratio between the platinum and the non-platinum metal, it is possible to form an ordering structure in which a composition ratio between the platinum and the non-platinum metal is close to 3:1.

On the other hand, when the platinum particles are first supported on the conductive carrier (for example, carbon) and then the supported platinum particles are temporarily immersed in a solution containing a complex of non-platinum metal, followed by heat treatment, to mutually diffuse (that is, sequentially reduce) and to produce an alloy, it is not possible to make a LP ratio 10% or more.

As above, when the platinum ion and the non-platinum metal ion are reduced simultaneously, a catalyst particle having a "LP ratio" of 10% or more and having numerous crystal faces of high activity exposed can be obtained. In this stage, the catalyst precursor particles do not necessarily have an extent of ordering of 30 to 100%. Also, the catalyst precursor particles do not necessarily have a $d_N/d_A$ ratio of 0.4 to 1.0.

Examples of the reducing agent which can be used in the process (2) include ethanol, methanol, propanol, formic acid, formate such as sodium formate and potassium formate, formaldehyde, sodium thiosulfate, citric acid, citrate such as sodium citrate and trisodium citrate, sodium borohydride ($NaBH_4$), and hydrazine ($N_2H_4$). Of the above reducing agents, trisodium citrate dihydrate may also act as an agglomeration preventing agent. The reducing agents may be in the form of hydrate. In addition, the reducing agents may be used in combination of two or more kinds thereof.

The reducing agent may be added to the mixed solution prepared in the above process (1) in the form of a reducing agent solution in which the reducing agent is dissolved in a solvent. The form of solution is preferred because uniform mixing can be performed with ease. The solvent is not particularly limited as long as the reducing agent can be dissolved therein, and is appropriately selected depending on the kind of the reducing agent. Specifically, the same solvents as the solvents used in the preparation of the mixed solution can be used. However, the solvent used in the reducing agent solution need not to be the same as the solvent used in the preparation of the mixed solution, but both of the solvents are preferably the same in view of uniform mixing property.

An amount of the reducing agent to be added is not particularly limited as long as the amount is sufficient to reduce metal ions. Specifically, the amount of the reducing agent to be added is preferably in the range of 1 to 10 moles, and more preferably in the range of 1.5 to 7 moles, with respect to 1 mole of the metal ions (total moles of platinum ions and non-platinum metal ions (in terms of metal)). With such an amount, the metal ions (platinum ions and non-platinum ions) are sufficiently reduced at the same time. When two or more kinds of reducing agent are used, the amount of the reducing agents to be added is preferably within the above range in total.

In the process (2), stirring is preferably performed after a reducing agent-containing liquid is added. By this, since the platinum precursor, the non-platinum metal precursor, and the reducing agent are uniformly mixed with each other, a uniform reduction reaction can occur. Here, stirring conditions are not particularly limited as long as the uniform mixing can be achieved. For example, the mixed solution can be uniformly dispersed and mixed by using a suitable stirring machine such as a stirrer and a homogenizer, or an ultrasonic dispersing apparatus which is configured to apply ultrasonic waves. A stirring temperature is preferably in the range of 0 to 50° C., and more preferably in the range of 5 to 40° C. In addition, a stirring time is not particularly limited as long as the platinum precursor, the non-platinum metal precursor, and the reducing agent can be uniformly mixed with each other.

By the reduction reaction, the catalyst precursor particles of the present invention can be obtained. If necessary, the catalyst precursor particles may be isolated from the catalyst precursor particle-containing liquid. An isolation method is not particularly limited, and the catalyst precursor particles can be isolated by filtration and drying. If necessary, after the filtration of the catalyst precursor particles, cleaning (for example, washing with water) may be performed. In addition, the filtration and the cleaning as necessary may be repeated. Furthermore, after the filtration or the cleaning, the catalyst precursor particles may be dried. The catalyst precursor particles may be dried in air or under a reduced pressure. A drying temperature is not particularly limited, but is, for example, in the range of 10 to 100° C., preferably in the approximate range from a room temperature (25° C.) to 80° C. A drying time is not particularly limited, but is, for example, in the range of 1 to 60 hours, preferably in the range of about 5 to 50 hours.

(Process (3))

In this process, a carbon carrier (hereinafter, simply also referred to as a "conductive carrier") is added to the catalyst precursor particle-containing liquid, thereby obtaining a catalyst precursor particle-supported carrier. In this case, the carbon carrier has at least one or more functional groups selected from the group consisting of a lactone group, a hydroxyl group, an ether group, and a carbonyl group formed on the surface thereof in a total amount of 0.5 µmol/m² or more.

Specifically, the conductive carrier is charged into the catalyst precursor particle-containing liquid which is a dispersion of the catalyst precursor particles, and stirred, to adsorb the catalyst precursor particles onto the conductive carrier. Thereafter, the catalyst particle-supported carrier having the catalyst precursor particles supported thereon can be obtained by filtering and cleaning the conductive carrier having the catalyst precursor particles adsorbed thereon.

The conductive carrier added to the catalyst precursor particle-containing liquid is a carbon carrier having at least one or more functional groups selected from the group consisting of a lactone group, a hydroxyl group, an ether group, and a carbonyl group formed on the surface thereof in a total amount of 0.5 µmol/m² or more.

A carbon carrier having at least one or more functional groups selected from the group consisting of a lactone group, a hydroxyl group, an ether group, and a carbonyl group formed on the surface thereof in a total amount of 0.8 to 5 µmol/m² is preferably used. By use of such a carbon carrier, the extent of ordering of the resulting a catalyst particle can be more easily controlled, and activity (mass specific activity and area specific activity; particularly, mass specific activity) can be further improved. This reason is considered that the agglomeration of alloy particles can be suppressed even by the heat-treatment for obtaining the catalyst particle and thus deterioration in the specific surface area of the entire a catalyst particle to be supported can be suppressed.

Moreover, even after heat-treatment of the following process (4), the carbon carrier has preferably at least one or more functional groups selected from the group consisting of a lactone group, a hydroxyl group, an ether group, and a carbonyl group formed on the surface thereof.

A method of measuring the amount of functional groups employs a value measured by a temperature-programmed desorption method. The temperature-programmed desorption method is a method of raising a temperature of a sample at an equal speed under an ultrahigh vacuum and detecting a gas component (molecules and atoms) to be released from the sample in real time using a quadrupole mass spectrometer. A temperature of the gas component to be released depends on an adsorption/chemical bonding state of the component on the surface of the sample. That is, a component requiring large energy for desorption/dissociation is detected at a relatively high temperature. The surface functional group formed on the carbon is discharged in the form of CO or $CO_2$ at different temperatures depending on the kind thereof. A temperature-programmed desorption curve obtained with respect to the CO or $CO_2$ is subjected to peak separation, thereby measuring integrated intensity T of each peak, and the amount (μmol) of each functional group component can be calculated from the integrated intensity T. From this amount (μmol), the amount of functional groups is calculated by the following formula.

$$\text{Amount of functional group (μmol/m}^2\text{)} = \text{Amount of each functional group component (μmol)/(BET specific surface area of carrier (m}^2\text{/g)} \times \text{Amount of sample (g))} \quad \text{[Mathematical Formula 3]}$$

A desorption gas and temperature of each functional group to be discharged by the temperature rising are as follows: lactone group—$CO_2$ (700° C.); hydroxyl group—CO (650° C.); ether group—CO (700° C.); and carbonyl group—CO (800° C.)

Furthermore, in the present invention, a value measured with the following apparatus and conditions is employed.

Apparatus: WA1000S/W manufactured by ESCO Ltd.
Vacuum degree of sample chamber: Order of $10^{-7}$ to $10^{-8}$ Pa
Heating system: Infrared rays
Temperature rising rate: 60° C./min.

In view that an appropriate specific surface area can be secured even after heat-treatment, a BET specific surface area of the conductive carrier added to the catalyst precursor particle-containing liquid is preferably in the range of 10 to 5000 $m^2$/g and more preferably in the range of 50 to 2000 $m^2$/g.

In view that an appropriate size can be secured even after heat-treatment, the conductive carrier added to the catalyst precursor particle-containing liquid has an average particle size of about 5 to 200 nm, and preferably of about 10 to 100 nm.

A method of producing a carbon carrier having a certain functional group is not particularly limited, but the carbon carrier can be obtained by, for example, contacting the carbon materials listed above as the conductive carrier with an acidic solution (hereinafter, this treatment is referred to as acid treatment); a steam activation treatment; gas-phase oxidation treatment (ozone, fluorine gas, or the like); or liquid-phase oxidation treatment (permanganate, chlorate, ozone water, or the like).

A preferred embodiment of acid treatment will be described below.

An acid used for the acidic solution is not particularly limited, but may include, for example, hydrochloric acid, sulfuric acid, nitric acid, and perchloric acid. Among them, at least one of sulfuric acid and nitric acid is preferably used from the viewpoint of formability of surface functional groups.

The carbon material brought into contact with the acidic solution is not particularly limited, but is preferably a carbon black in view of having a large specific surface area and being stable even by the acid treatment.

The acid treatment is not only performed one time such that the support is brought into contact with the acidic solution but also repeated several times. When the acid treatment is performed several times, the kind of acidic solution may be changed for every treatment. A concentration of the acidic solution is appropriately set in consideration of, for example, the kind of the carbon material and acid, but is preferably set to be in the range of 0.1 to 10 mol/L.

A method of bringing the carbon material into contact with the acidic solution (acid treatment method) is not particularly limited, but includes preferably a process (process X) of mixing the carbon material with the acidic solution to prepare a carbon-material dispersion and a process (process Y) of heating the carbon-material dispersion to impart a functional group to the surface of the carbon material.

In the process X, the carbon material is preferably mixed with the acidic solution. The carbon-material dispersion is preferably stirred so as to be sufficiently and uniformly mixed. Stirring conditions are not particularly limited as long as the uniform mixing can be achieved. For example, the mixed solution can be uniformly dispersed and mixed by using a suitable stirring machine such as a stirrer and a homogenizer, or an ultrasonic dispersing apparatus which is configured to apply ultrasonic waves. Further, in the process X, a stirring temperature is preferably in the range of 5 to 40° C. In addition, a stirring time may be appropriately set to perform sufficient dispersion. Typically, the stirring time is in the range of 1 to 60 minutes, and preferably in the range of 3 to 30 minutes.

In the above process Y, the functional group is imparted to the surface of the carbon material by heating the carbon-material dispersion prepared in the process X. Heating conditions are not particularly limited as long as the functional group can be imparted to the surface of the carbon material. For example, a heating temperature is preferably in the range of 60 to 90° C. In addition, a heating time is preferably in the range of 1 to 4 hours. With these conditions, the functional group can be sufficiently imparted to the surface of the carbon material.

Then, cleaning is also preferably performed, and the cleaning may be also performed several times. After the cleaning, drying is preferably performed. In this way, an acid-treated carbon carrier (carbon carrier having a certain functional group) can be obtained.

The acid-treated carbon carrier (carbon carrier having a certain functional group) is added to an appropriate solvent (for example, ultrapure water) to yield a suspension. The suspension is preferably stirred until being mixed with the catalyst precursor particle-containing liquid.

A mixing ratio between the catalyst precursor particles and the conductive carrier is not particularly limited, but is preferred such that the supported concentration (supported amount) of the catalyst particle reaches as described above.

In addition, stirring is preferably performed after the conductive carrier is added to the catalyst precursor particle-containing liquid. Thereby, the catalyst precursor particles and the conductive carrier are uniformly mixed with each other, so that the catalyst precursor particles can be highly dispersed and supported on the conductive carrier. Since an unreduced platinum precursor or non-platinum metal precursor is reduced with the reducing agent at the same time by the stirring treatment, the catalyst precursor particles can be more highly dispersed and supported on the conductive carrier. Stirring conditions are not particularly limited as long as the uniform mixing can be achieved. For example, the mixed solution can be uniformly dispersed and mixed by using a suitable stirring machine such as a stirrer and a homogenizer, or an ultrasonic dispersing apparatus which is configured to apply ultrasonic waves. Furthermore, a stirring temperature is preferably in the range of 0 to 50° C., and more preferably in the range of 5 to 40° C. In addition, a stirring time is in the range of 1 to 90 hours, and more preferably in the range of 5 to 80 hours. With these conditions, the catalyst precursor particles can be more highly dispersed and supported on the conductive carrier. In addition, since an unreduced platinum precursor or non-platinum metal precursor can further be reduced with the reducing agent, the catalyst precursor particles can be more efficiently and highly dispersed and supported on the conductive carrier. For the addition of the conductive carrier to the catalyst precursor particle-containing liquid, only the conductive carrier may be added to the catalyst precursor particle-containing liquid, and the conductive carrier may be added to the catalyst precursor particle-containing liquid in the form of suspension as described above.

By the supporting treatment, a conductive carrier (the catalyst precursor particle-supported carrier or the supported carrier) having the catalyst precursor particles supported thereon can be obtained. If necessary, the supported support may be isolated. An isolation method is not particularly limited, and the supported support can be isolated by filtration and drying. If necessary, after the filtration of the supported support, cleaning (for example, washing with water) may be performed. In addition, the filtration and the cleaning as necessary may be repeated. Furthermore, after the filtration or the cleaning, the supported support may be dried. The supported support may be dried in air or under a reduced pressure. A drying temperature is not particularly limited, but is, for example, in the range of 10 to 100° C., preferably in the approximate range from a room temperature (25° C.) to 80° C. A drying time is also not particularly limited, but is, for example, in the range of 1 to 60 hours, preferably in the range of about 5 to 48 hours.

The supporting of the catalyst precursor particles on the conductive carrier is performed by an impregnation method in the above description, but is not limited to the above method. In addition to the above method, for example, a known method such as a liquid phase reduction supporting method, an evaporation drying method, a colloid adsorption method, a spray pyrolysis method, or reverse micelle (micro-emulsion method) may be used. However, in the present invention, even when any method is used, the supporting is performed by the simultaneous reduction.

(Process (4))

In this process, the catalyst precursor particle-supported carrier obtained in the above process (3) is subjected to heat-treatment. By this process, the extend of ordering of the $L1_2$ structure of the catalyst precursor particle can be increased to the range of 30 to 100% and the $d_N/d_A$ ratio of the catalyst precursor particles can be adjusted within the range of 0.4 to 1.0, to obtain the catalyst (electrode catalyst) having the catalyst particle of the present invention supported on the conductive carrier. By selecting heat-treatment conditions, the extent of ordering of the $L1_2$ structure of the catalyst precursor particles can be controlled. The heat-treatment is performed after the catalyst particle (s) is supported on the conductive carrier. By this method, it is possible to perform the control of the $d_N/d_A$ ratio and the extent of ordering and the supporting at the same time.

The heat-treatment conditions are not particularly limited as long as the extent of ordering can be increased to the range of 30 to 100% and the $d_N/d_A$ ratio can be adjusted within the range of 0.4 to 1.0, but it is important to control a temperature and a time of the heat-treatment.

Specifically, when a heat-treatment temperature is in the range of 350 to 450° C., the heat-treatment is preferably performed for a period of preferably 120 minutes over, and more preferably 240 minutes or more.

The upper limit of the heat-treatment time at the heat-treatment temperature is not particularly limited as long as the catalyst particle can be continued to be supported on the conductive carrier, but is appropriately selected depending on the particle diameter or type of the catalyst particle. For example, the heat-treatment time is typically 36 hours or less, preferably 24 hours or less, more preferably 10 hours or less, and further more preferably 5 hours or less.

A heat-treatment atmosphere is not particularly limited when the heat-treatment temperature is in the range of 350 to 450° C., but the heat-treatment is preferably performed in a non-oxidizing atmosphere so as to suppress and prevent oxidation of the alloy (platinum and non-platinum metal) and/or to further proceed the reduction to the platinum or the non-platinum metal. An example of the non-oxidizing atmosphere includes an inert gas atmosphere or a reducing gas atmosphere. An inert gas is not particularly limited, but for example, helium (He), neon (Ne), argon (Ar), krypton (Kr), xenon (Xe), and nitrogen ($N_2$) can be used. The inert gas may be used alone or in the mixed gas form of two or more kinds. In addition, the reducing gas atmosphere is not particularly limited as long as a reducing gas is included, but is more preferably a mixed gas atmosphere of a reducing gas and an inert gas. The reducing gas is not particularly limited, but is preferably a hydrogen ($H_2$) gas, and a carbon monoxide (CO) gas. In addition, a concentration of the reducing gas contained in the inert gas is also not particularly limited, but the content of the reducing gas in the inert gas is preferably in the range of 10 to 100 vol %, and more preferably in the range of 50 to 100 vol %. With such a concentration, the oxidation of the alloy (platinum and non-platinum metal) can be sufficiently suppressed and prevented. Of the above, the heat-treatment is preferably performed in the reducing gas atmosphere. With these conditions, the catalyst particle can effectively achieve a desired $d_N/d_A$ ratio without being agglomerated on the support. In addition, with the above conditions, it is possible to more effectively control the extent of ordering of the resulting a catalyst particle (alloy particle) in the range of 30 to 100% while suppressing the increase in the diameter of the catalyst particle.

When the heat-treatment temperature exceeds 450° C. but is 750° C. or lower, the heat-treatment is preferably performed for a period of 10 minutes or more, and more preferably 20 minutes or more. The upper limit of the heat-treatment time at the heat-treatment temperature is not particularly limited as long as the catalyst particle can be continued to be supported on the conductive carrier, but is appropriately selected depending on the diameter or type of the catalyst particle. For example, the heat-treatment time is typically 36 hours or less, preferably 24 hours or less, more preferably 10 hours or less, and further more preferably 5 hours or less.

A heat-treatment atmosphere is not particularly limited when the heat-treatment temperature exceeds 450° C. but is 750° C. or lower, but the heat-treatment is preferably performed in a non-oxidizing atmosphere so as to suppress and prevent oxidation of the alloy (platinum and non-platinum metal) and/or to further proceed the reduction to the platinum or the non-platinum metal. Here, since the non-oxidizing atmosphere is the same as defined in the case where the heat-treatment temperature is in the range of 350 to 450° C., the description thereof will be omitted. Of the above, the heat-treatment is preferably performed in an inert gas atmosphere or a reducing gas atmosphere. With these conditions, the catalyst particle can effectively achieve a desired $d_N/d_A$ ratio without being agglomerated on the support. In addition, with the above conditions, it is possible to more effectively control the extent of ordering of the resulting a catalyst particle (alloy particle) in the range of 30 to 100% while suppressing the increase in the diameter of the catalyst particle.

When the heat-treatment temperature exceeds 750° C., the heat-treatment is preferably performed for 10 to 45 minutes, and more preferably 20 to 40 minutes in a reducing gas atmosphere. Alternatively, the heat-treatment is preferably performed for 10 to 120 minutes, more preferably 30 to 100 minutes, and particularly preferably a period exceeding 45 minutes and of no more than 90 minutes in an inert gas atmosphere.

The upper limit of the heat-treatment temperature is not particularly limited as long as the catalyst particle can be continued to be supported on the conductive carrier, but is appropriately selected depending on the diameter or type of the catalyst particle. Although the extent of ordering increases in proportion to the temperature and the time during the heat-treatment, the particle diameter tends to be increased by sintering. In consideration of the above point, for example, the heat-treatment temperature may be 1000° C. or lower. With such conditions, it is also possible to suppress agglomeration of the resulting a catalyst particle (alloy particle) on the support while suppressing the increase in the diameter of the catalyst particle, thereby controlling so as to give a desired $d_N/d_A$ ratio. As used herein, since the "inert gas atmosphere" and the "reducing gas atmosphere" are the same as defined in the case where the heat-treatment temperature is in the range of 350 to 450° C., the description thereof will be omitted. With these conditions, the catalyst particle can effectively achieve a desired $d_N/d_A$ ratio without being agglomerated on the support. In addition, with the above conditions, it is possible to more effectively control the extent of ordering of the resulting a catalyst particle (alloy particle) in the range of 30 to 100% while suppressing the increase in the diameter of the catalyst particle.

In a preferred embodiment of the present invention, the heat-treatment of the catalyst precursor particle-supported carrier is performed (a) at a temperature in the range of 350 to 450° C. for a time exceeding 120 minutes under a reducing gas atmosphere or an inert gas atmosphere; (b) at a temperature exceeding 450° C. but 750° C. or lower for 10 minutes or more under a reducing gas atmosphere or an inert gas atmosphere; (c) at a temperature exceeding 750° C. for a time of 10 to 120 minutes under an inert gas atmosphere; or (d) at a temperature exceeding 750° C. for a time of 10 to 45 minutes under a reducing gas atmosphere.

Since the LP ratio can be increased before the heat-treatment (that is, during the simultaneous reduction), it is expected, from the viewpoint of maintaining its state, that the LP ratio can be increased by the heat-treatment for a shorter time when it is considered that factors other than the heat-treatment time are fixed. In addition, assuming that the conditions before the heat-treatment are the same and when other conditions are fixed, it is expected that the LP ratio can be increased by calcinations under a hydrogen atmosphere.

As described above, it is possible to produce the catalyst particle (alloy particle) of the present invention containing the platinum atom and the non-platinum metal atom in which the extent of ordering is in the range of 30 to 100%, the LP ratio is 10% or more, and the $d_N/d_A$ ratio is in the range of 0.4 to 1.0, or the electrode catalyst having such a catalyst particle (alloy particle) supported on the conductive carrier.

The electrode catalyst obtained in this manner can exhibit high activity (area specific activity, mass specific activity) even with a small content of platinum. In addition, the electrode catalyst is excellent in durability (has high activity even after a durability test).

[Electrolyte Membrane-Electrode Assembly (MEA)]

The electrode catalyst as described above can be suitably used for an electrolyte membrane-electrode assembly (MEA). That is, the present invention also provides an electrolyte membrane-electrode assembly (MEA) including the electrode catalyst of the present invention, and particularly, an electrolyte membrane-electrode assembly (MEA) for fuel cell. The electrolyte membrane-electrode assembly (MEA) of the present invention can exhibit high power generation performance and durability.

The electrolyte membrane-electrode assembly (MEA) of the present invention can be configured in the same manner as the conventional electrolyte membrane-electrode assembly except for using the electrode catalyst (catalyst) of the present invention instead of the conventional electrode catalyst. A preferred embodiment of the MEA of the present invention will be described below, but the present invention is not limited thereto.

The MEA is comprised of an electrolyte membrane, an anode catalyst layer and an anode gas diffusion layer; and a cathode catalyst layer and a cathode gas diffusion layer which are sequentially formed on both sides of the electrolyte membrane. Then, in the electrolyte membrane-electrode assembly, the electrode catalyst of the present invention is used in at least one of the cathode catalyst layer and the anode catalyst layer.

(Electrolyte Membrane)

An electrolyte membrane is configured with a solid polymer electrolyte membrane. The solid polymer electrolyte membrane serves to selectively transmit protons generated in an anode catalyst layer to a cathode catalyst layer in the thickness direction during the operation of the fuel cell (PEFC or the like), for example. In addition, the solid polymer electrolyte membrane also serves as a partition wall for preventing a fuel gas supplied to an anode side from being mixed with an oxidant gas supplied to a cathode side.

An electrolyte material constituting the solid polymer electrolyte membrane is not particularly limited, but well-known knowledge in the art may be appropriately referred to. For example, the fluorine-based polymer electrolyte or the hydrocarbon-based polymer electrolyte described below as the polymer electrolyte in the catalyst layer can be used. There is no need to use the polymer electrolyte which is necessarily the same as the polymer electrolyte used for the catalyst layer.

A thickness of the electrolyte layer is not particularly limited, but it may be determined by taking into consideration characteristics of the obtained fuel cell. The thickness of the electrolyte layer is typically in the range of about 5 to 300 μm. If the thickness of the electrolyte layer is within such a range, balance between strength during the film formation or durability during the use and output characteristics during the use can be appropriately controlled.

(Catalyst Layer)

A catalyst layer is a layer in which cell reaction proceeds actually. Specifically, oxidation of hydrogen proceeds in an anode catalyst layer, whereas reduction of oxygen proceeds in a cathode catalyst layer. The catalyst of the present invention may be present in either of the cathode catalyst layer or the anode catalyst layer. In view of the need for improving oxygen reduction activity, the electrode catalyst of the present invention is preferably used at least in the cathode catalyst layer. However, the catalyst layer according to the embodiment is not particularly limited, and for example, may be used as the anode catalyst layer, and may be used as both of the cathode catalyst layer and the anode catalyst layer.

The catalyst layer includes the electrode catalyst of the present invention and an electrolyte. The electrolyte is not particularly limited, but it is preferably an ion-conductive polymer electrolyte. Since the polymer electrolyte serves to transfer protons generated in the vicinity of the catalyst active material on a fuel electrode side, the polymer electrolyte is also referred to as a proton conductive polymer.

The polymer electrolyte is not particularly limited, but well-known knowledge in the art can be appropriately referred to. The polymer electrolytes are mainly classified into fluorine-based polymer electrolytes and hydrocarbon-based polymer electrolytes depending on a type of an ion-exchange resin as a constituent material.

As an ion-exchange resin constituting the fluorine-based polymer electrolyte, for example, perfluorocarbon sulfonic acid based polymers such as Nafion (registered trademark, produced by DuPont), Aciplex (registered trademark, produced by Asahi Kasei Co., Ltd.), and Flemion (registered trademark, produced by Asahi Glass Co., Ltd.), perfluorocarbon phosphoric acid based polymers, trifluorostyrene sulfonic acid based polymers, ethylene tetrafluoroethylene-g-styrene sulfonic acid based polymers, ethylene-tetrafluoroethylene copolymers, polyvinylidene fluoride-perfluorocarbon sulfonic acid based polymers, and the like may be exemplified. In terms excellent heat resistance, chemical stability, durability, and mechanical strength, the fluorine-based polymer electrolyte is preferably used, and a fluorine-based polymer electrolyte formed of a perfluorocarbon sulfonic acid based polymer is particularly preferably used.

As a hydrocarbon-based electrolyte, sulfonated polyether sulfones (S-PES), sulfonated polyaryl ether ketones, sulfonated polybenzimidazole alkyls, phosphonated polybenzimidazole alkyls, sulfonated polystyrenes, sulfonated polyether ether ketones (S-PEEK), sulfonated polyphenylenes (S-PPP), and the like may be exemplified. In terms of manufacturing advantages such as inexpensive raw materials, simple manufacturing processes, and high selectivity of materials, a hydrocarbon-based polymer electrolyte is preferably used. These ion-exchange resins may be singly used, or two or more resins may be used together. In addition, the material is not limited to the above-described material, but another material may be used.

With respect to the polymer electrolyte which serves to transfer protons, proton conductivity is important. In the case where EW of a polymer electrolyte is too large, ion conductivity with in the entire catalyst layer would be decreased. Therefore, the catalyst layer according to the embodiment preferably includes a polymer electrolyte having a small EW. Specifically, catalyst layer according to the embodiment preferably includes a polymer electrolyte having an EW of 1500 g/eq. or less, more preferably includes a polymer electrolyte having an EW of 1200 g/eq. or less, and particularly preferably includes a polymer electrolyte having an EW of 1000 g/eq. or less. On the other hand, in the case where the EW is too small, since hydrophilicity is too high, water is hard to smoothly move. Due to such a point of view, the EW of polymer electrolyte is preferably 600 g/eq. or more. The EW (Equivalent Weight) represents an equivalent weight of an exchange group having proton conductivity. The equivalent weight is a dry weight of an ion exchange membrane per 1 eq. of ion exchange group, and is represented in units of "g/eq.".

It is preferable that the catalyst layer includes two types or more of polymer electrolytes having different EWs in a power generation surface, and in this case, among the polymer electrolytes, the polymer electrolyte having the lowest EW is used in an area where relative humidity of a gas in a passage is 90% or less. By employing such material arrangement, resistance is decreased irrespective of a current density area, so that cell performance can be improved. The EW of polymer electrolyte used in the area where relative humidity of the gas in a passage is 90% or less, that is, EW of polymer electrolyte having the lowest EW is preferably 900 g/eq. or less. By this, the above-described effects can be further more certainly and more remarkably attained.

The polymer electrolyte having the lowest EW is preferably used in an area of which temperature is higher than an average temperature of inlet and outlet for cooling water. By this, resistance is decreased irrespective of a current density area, so that cell performance can be further improved.

In terms decreased resistance value of a fuel cell system, the polymer electrolyte having the lowest EW is preferably provided in an area within the range of ⅗ or less of the passage length from a gas supply inlet of at least one of a fuel gas and an oxidant gas.

If necessary, the catalyst layer may contain an additive including a water repellent such as polytetrafluoroethylene, polyhexafluoropropylene, and tetrafluoroethylene-hexafluoropropylene copolymer, a dispersant such as a surfactant, a thickener such as glycerin, ethylene glycol (EG), polyvinyl alcohol (PVA), and propylene glycol (PG), a pore-forming agent, or the like.

A thickness (as a dried thickness) of the catalyst layer is preferably in the range of 0.05 to 30 μm, more preferably in the range of 1 to 20 μm, even more preferably in the range of 2 to 15 μm. The thickness can be applied to both of the cathode catalyst layer and the anode catalyst layer. However, the thickness of the cathode catalyst layer and the thickness of the anode catalyst layer may be equal to or different from each other.

(Gas Diffusion Layer)

A gas diffusion layer (anode gas diffusion layer $4a$, cathode gas diffusion layer $4c$) serves to facilitate diffusion of a gas (fuel gas or oxidant gas) supplied through a gas passage ($6a$, $6c$) of a separator to a catalyst layer ($3a$, $3c$) and also serves as an electron conducting path.

A material constituting a substrate of the gas diffusion layers ($4a$, $4c$) is not particularly limited, but well-known knowledge in the related art may be appropriately referred to. For example, a sheet-shaped material having conductivity and porous property such as a fabric made of carbon, a sheet-shaped paper, felt, and a nonwoven fabric may be exemplified. A thickness of the substrate may be appropriately determined by considering characteristics of the obtained gas diffusion layer. The thickness of the substrate may be in the range of about 30 to 500 μm. If the thickness of the substrate is within such a range, balance between mechanical strength and diffusibility of gas, water, and the like can be appropriately controlled.

The gas diffusion layer preferably includes a water repellent for the purpose of preventing a flooding phenomenon or the like by improving water repellent property. The water repellent is not particularly limited, but fluorine-based polymer materials such as polytetrafluoroethylene (PTFE), polyvinylidene fluoride (PVdF), polyhexafluoropropylene, and tetrafluoroethylene-hexafluoropropylene copolymer (FEP), polypropylene, polyethylene, and the like may be exemplified.

In order to further improve water repellent property, the gas diffusion layer may include a carbon particle layer (microporous layer (MPL), not shown) configured with an assembly of carbon particles including a water repellent provided at the catalyst-layer side of the substrate.

Carbon particles included in the carbon particle layer are not particularly limited, but well-known materials in the art such as carbon black, graphite, and expandable graphite may be appropriately employed. Among the materials, due to excellent electron conductivity and a large specific surface area, carbon black such as oil furnace black, channel black, lamp black, thermal black, and acetylene black can be preferably used. An average particle diameter of the carbon particles may be set to be in the range of about 10 to 100 nm. By this, high water-repellent property by a capillary force can be obtained, and contacting property with the catalyst layer can be improved.

As the water repellent used for the carbon particle layer, the above-described water repellent may be exemplified. Among the materials, due to excellent water repellent property and excellent corrosion resistance during the electrode reaction, the fluorine-based polymer material can be preferably used.

A mixing ratio of the carbon particles and the water repellent in the carbon particle layer may be set to be in the range of weight ratio of about 90:10 to 40:60 (carbon particle: water repellent) by taking into consideration balance between water repellent property and electron conductivity. Meanwhile, a thickness of the carbon particle layer is not particularly limited, but it may be appropriately determined by taking into consideration water repellent property of the obtained gas diffusion layer.

(Method of Manufacturing Electrolyte Membrane-Electrode Assembly)

A method of manufacturing a membrane electrode assembly is not particularly limited, and a well-known method in the art may be used. For example, a method which comprises transferring a catalyst layer to a solid polymer electrolyte membrane by using a hot press, or coating a solid polymer electrolyte membrane with a catalyst layer and drying the coating, and joining the resulting laminate with gas diffusion layers, or a method which comprises coating a microporous layer (in the case of not including a microporous layer, one surface of a substrate layer) of a gas diffusion layer with a catalyst layer in advance and drying the resulting product to produce two gas diffusion electrodes (GDEs), and joining both surfaces of the solid polymer electrolyte membrane with the two gas diffusion electrodes by using a hot press can be used. The coating and joining conditions by hot press and the like may be appropriately adjusted according to a type of the polymer electrolyte (perfluorosulfonic acid-based or hydrocarbon-based) in the solid polymer electrolyte membrane or the catalyst layer.

[Fuel Cell]

The electrolyte membrane-electrode assembly (MEA) described above can be suitably used for a fuel cell. That is, the present invention also provides a fuel cell obtained by using the electrolyte membrane-electrode assembly (MEA) of the present invention. The fuel cell of the present invention can exhibit high power generation performance and durability. The fuel cell of the present invention includes a pair of anode separator and cathode separator interposing the electrolyte membrane-electrode assembly of the present invention.

(Separator)

In the case of configuring a fuel cell stack by connecting a plurality of unit fuel cells of polymer electrolyte fuel cells in series, a separator serves to electrically connect the cells in series. The separator also serves as a partition wall for separating a fuel gas, an oxidant gas, and a coolant from each other. In order to secure a passage thereof, as described above, gas passages and coolant passages are preferably installed in each of the separators. As a material constituting the separator, well-known materials in the art of carbon such as dense carbon graphite and a carbon plate, a metal such as a stainless steel, or the like can be employed without limitation. A thickness or size of the separator, a shape or size of the installed passages, and the like are not particularly limited, but they can be appropriately determined by taking into consideration desired output characteristics and the like of the obtained fuel cell.

A manufacturing method for the fuel cell is not particularly limited, and well-known knowledge in the art in the field of fuel cell may be appropriately referred to.

Furthermore, in order that the fuel cell can generate a desired voltage, a fuel cell stack may be formed by connecting a plurality of membrane electrode assemblies in series through a separator. A shape and the like of the fuel cell are not particularly limited, and they may be appropriately determined so as to obtain desired cell characteristics such as a voltage.

The above-described PEFC or membrane electrode assembly uses the catalyst layer having excellent power generation performance and excellent durability. Therefore, the PEFC or membrane electrode assembly shows excellent power generation performance and durability.

The PEFC according to the embodiment and the fuel cell stack using the PEFC can be mounted on a vehicle, for example, as a driving power source.

EXAMPLE

The effects of the present invention will be described with reference to the following Examples and Comparative Examples. However, the scope of the present invention is not limited to the Examples. Unless otherwise specified, each operation is performed at a room temperature (25° C.) and a relative humidity of 40 to 50%.

Example 1-1

2 g of carbon carrier (Ketjen Black (registered trademark) KetjenBlack EC300J produced by Lion Corporation, average particle diameter: 40 nm, BET specific surface area: 800 m$^2$/g) was added to 500 mL of 0.5 M HNO$_3$ solution in a beaker, and was then stirred and mixed at 300 rpm for 30 minutes at a room temperature (25° C.) using a stirrer. Subsequently, under stirring at 300 rpm, the mixture was subjected to heat-treatment at 80° C. for two hours, to obtain a carbon carrier. Then, after being filtered, the carbon carrier was washed with ultrapure water. The filtering and washing described above were repeated three times in total. After the carbon carrier was dried at 60° C. for 24 hours, an acid-treated carbon carrier A was obtained. The resulting acid-treated carbon carrier A has an amount of at least one or more functional groups selected from the group consisting of a lactone group, a hydroxyl group, an ether group, and a carbonyl group formed on the surface thereof of 1.25 µmol/m$^2$, a BET specific surface area of 850 m$^2$/g, and an average particle diameter of 40 nm.

0.2 g of the acid-treated carbon carrier A was added to 100 ml of ultrapure water in a beaker, and was then subjected to ultrasonic treatment for 15 minutes, to obtain a carrier suspension A. Until being added to catalyst precursor particles, the carrier suspension A was continuously stirred at 150 rpm at a room temperature (25° C.)

21.8 mL (135 mg in terms of Co) of 0.105 M aqueous cobalt chloride (CoCl$_2$.6H$_2$O) solution and 0.36 mL (92 mg in terms of platinum) of 1.32 M aqueous chloroplatinic acid (H$_2$[PtCl$_6$].6H$_2$O) solution were charged into 1000 ml of ultrapure water in a beaker. The resulting solution was stirred and mixed with a stirrer at a room temperature (25° C.) for five minutes, to prepare a mixed solution.

Separately, 1.2 g of trisodium citrate dehydrate and 0.4 g of sodium borohydride were dissolved in 100 mL of ultrapure water, to prepare a reducing agent solution.

100 mL of the above-prepared reducing agent solution was charged into the above resulting mixed solution, and then stirred and mixed with a stirrer at a room temperature (25° C.) for 30 minutes, followed by being subjected to reduction and precipitation, to obtain a solution containing catalyst precursor particles (Pt—Co mixed particles). Next, the carrier suspension A containing 0.2 g of the acid-treated carbon carrier A was added to the resultant solution and then stirred and mixed with a stirrer at a room temperature (25° C.) for 48 hours, to support the catalyst precursor particles on the carrier. Thereafter, the catalyst precursor particle-supported carrier was washed with ultrapure water after being filtered. After the above filtering and washing were repeated three times in total, a carrier having a catalyst particle supported thereon was obtained by filtering.

After being dried at 60° C. for 12 hours, the carrier having a catalyst particle supported thereon was subjected to heat-treatment process at 600° C. for 120 minutes in an argon gas atmosphere. Thus, an electrode catalyst 1-1 was obtained. In the electrode catalyst 1-1, the extent of ordering was measured to be 66%. Further, in the electrode catalyst 1-1, a supported concentration (supported amount) of the catalyst particle was 32.4 wt % (Pt: 28.0 wt %, Co: 4.4 wt %) with respect to the carrier, the number average particle diameter ($d_N$) was 5.1 nm, and the LP ratio was 17.4. The supported concentration was measured by ICP analysis. The same is applied to the following.

With respect to the electrode catalyst 1-1, potential scanning was performed at a speed of 10 mV/s from 0.2 V to 1.2 V in 0.1 M perchloric acid of 25° C. saturated with oxygen, and then a skin layer was measured, to find that the number of skin layers was 0 to 1.

Example 2-1

7.3 mL (45 mg in terms of Co) of 0.105 M aqueous cobalt chloride ($CoCl_2.6H_2O$) solution and 0.12 mL (30.7 mg in terms of platinum) of 1.32 M aqueous chloroplatinic acid solution were charged into 1000 ml of ultrapure water in a beaker. The resulting solution was stirred and mixed with a stirrer at a room temperature (25° C.) for five minutes, to prepare a mixed solution.

Separately, 0.4 g of trisodium citrate dihydrate and 0.15 g of sodium borohydride were dissolved in 100 mL of ultrapure water, to prepare a reducing agent solution.

100 mL of the above-prepared reducing agent solution was charged into the above resulting mixed solution, and then stirred and mixed with a stirrer at a room temperature (25° C.) for 30 minutes, followed by being subjected to reduction and precipitation, to obtain a solution containing catalyst precursor particles (Pt—Co mixed particles). Next, the carrier suspension A containing 0.2 g of the acid-treated carbon carrier A was added to the resultant solution and then stirred and mixed with a stirrer at a room temperature (25° C.) for 48 hours, to support the catalyst precursor particles on the carrier. Thereafter, the catalyst precursor particle-supported carrier was washed with ultrapure water after being filtered. After the above filtering and washing were repeated three times in total, a carrier having a catalyst particle supported thereon was obtained by filtering. After being dried at 60° C. for 12 hours, the carrier having a catalyst particle supported thereon was subjected to heat-treatment process at 600° C. for 120 minutes in a 100 vol % hydrogen gas atmosphere. Thus, an electrode catalyst 2-1 was obtained. In the electrode catalyst 2-1, the extent of ordering was measured to be 47%. Further, in the electrode catalyst 2-1, a supported concentration (supported amount) of the catalyst particle was 14.3 wt % (Pt: 11.8 wt %, Co: 2.5 wt %) with respect to the carrier, the number average particle diameter ($d_N$) was 6.0 nm, and the LP ratio was 13.4.

With respect to the electrode catalyst 2-1, potential scanning was performed at a speed of 10 mV/s from 0.2 V to 1.2 V in 0.1 M perchloric acid of 25° C. saturated with oxygen, and then a skin layer was measured, to find that the number of skin layers was 0 to 1.

Example 3-1

36.3 mL (225 mg in terms of Co) of 0.105 M aqueous cobalt chloride ($CoCl_2.6H_2O$) solution and 0.6 mL (153 mg in terms of platinum) of 1.32 M aqueous chloroplatinic acid ($H_2[PtCl_6].6H_2O$) solution were charged into 1000 ml of ultrapure water in a beaker. The resulting solution was stirred and mixed with a stirrer at a room temperature (25° C.) for five minutes, to prepare a mixed solution.

Separately, 2 g of trisodium citrate dihydrate and 0.67 g of sodium borohydride were dissolved in 100 mL of ultrapure water, to prepare a reducing agent solution.

100 mL of the above-prepared reducing agent solution was charged into the above resulting mixed solution, and then stirred and mixed with a stirrer at a room temperature (25° C.) for 30 minutes, followed by being subjected to reduction and precipitation, to obtain a solution containing catalyst precursor particles (Pt—Co mixed particles). Next, 100 mL of the carrier suspension A containing 0.2 g of the acid-treated carbon carrier A was added to the resultant solution and then stirred and mixed with a stirrer at a room temperature (25° C.) for 48 hours, to support the catalyst precursor particles on the carrier. Thereafter, the catalyst precursor particle-supported carrier was washed with ultrapure water after being filtered. After the above filtering and washing were repeated three times in total, a carrier having a catalyst particle supported thereon was obtained by filtering. After being dried at 60° C. for 12 hours, the carrier having a catalyst particle supported thereon was subjected to a heat-treatment process at 600° C. for 120 minutes under a 100 vol % hydrogen gas atmosphere.

Thus, an electrode catalyst 3-1 was obtained. In the electrode catalyst 3-1, the extent of ordering was measured to be 68%. Further, in the electrode catalyst 3-1, a supported concentration (supported amount) of the catalyst particle was 49.1 wt % (Pt: 42.0 wt %, Co: 7.1 wt %) with respect to the carrier, the number average particle diameter ($d_N$) was 5.5 nm, and the LP ratio was 29.0.

Example 4-1

An electrode catalyst 4-1 was obtained in the same manner as in Example 1-1 except that heat-treatment was performed at 700° C. for 120 minutes in an argon gas atmosphere in Example 1-1. In the electrode catalyst 4-1, the extent of ordering was measured to be 60%. Further, in the electrode catalyst 4-1, a supported concentration (supported amount) of the catalyst particle was 34.5 wt % (Pt: 29.7 wt %, Co: 4.8 wt %) with respect to the carrier, the number average particle diameter ($d_N$) was 5.5 nm, and the LP ratio was 24.7.

Example 5-1

An electrode catalyst 5-1 was obtained in the same manner as in Example 1-1 except that heat-treatment was performed at 800° C. for 30 minutes in a 100 vol % hydrogen gas atmosphere in Example 1-1. In the electrode catalyst 5-1, the extent of ordering was measured to be 49%. Further, in the electrode catalyst 5-1, a supported concentration (supported amount) of the catalyst particle was 34.6 wt % (Pt: 30.0 wt %, Co: 4.6 wt %) with respect to the carrier, the number average particle diameter ($d_N$) was 7.0 nm, and the LP ratio was 16.7.

With respect to the electrode catalyst 5-1, potential scanning was performed at a speed of 10 mV/s from 0.2 V to 1.2 V in 0.1 M perchloric acid of 25° C. saturated with oxygen, and then a skin layer was measured, to find that the number of skin layers was 1 to 2.

Example 6-1

An electrode catalyst 6-1 was obtained in the same manner as in Example 1-1 except that heat-treatment was performed at 800° C. for 60 minutes in an argon gas atmosphere in Example 1-1. In the electrode catalyst 6-1, the extent of ordering was measured to be 62%. Further, in the electrode catalyst 6-1, a supported concentration (supported amount) of the catalyst particle was 34.9 wt % (Pt: 30.1 wt %, Co: 4.8 wt %) with respect to the carrier, the number average particle diameter ($d_N$) was 5.6 nm, and the LP ratio was 24.0.

Comparative Example 1-1

A comparative electrode catalyst 1-1 was obtained in the same manner as in Example 1-1 except that heat-treatment was not performed in Example 1-1. In the comparative electrode catalyst 1-1, the extent of ordering was measured to be 0%. Further, in the comparative electrode catalyst 1-1, a supported concentration (supported amount) of the catalyst particle was 33.8 wt % (Pt: 28.9 wt %, Co: 4.9 wt %) with respect to the carrier, the number average particle diameter ($d_N$) was 2.8 nm, and the LP ratio was 41.7.

Example 1-2

0.2 g of the acid-treated carbon carrier A was added to 100 ml of ultrapure water in a beaker, and then subjected to ultrasonic treatment for 15 minutes, to obtain a carrier suspension A. Until being added to catalyst precursor particles, the carrier suspension A was continuously stirred at a speed of 150 rpm at the room temperature (25° C.). 21.8 mL (135 mg in terms of Co) of 0.105 M aqueous cobalt chloride ($CoCl_2 \cdot 6H_2O$) solution and 0.36 mL (92 mg in terms of platinum) of 1.32 M aqueous chloroplatinic acid ($H_2[PtCl_6] \cdot 6H_2O$) solution were charged into 1000 ml of ultrapure water in a beaker. The resulting solution was stirred and mixed with a stirrer at a room temperature (25° C.) for five minutes, to prepare a mixed solution.

Separately, 1.2 g of trisodium citrate dihydrate and 0.4 g of sodium borohydride were dissolved in 100 mL of ultrapure water, to prepare a reducing agent solution.

100 mL of the above-prepared reducing agent solution was charged into the above resulting mixed solution, and then stirred and mixed with a stirrer at a room temperature (25° C.) for 30 minutes, followed by being subjected to reduction and precipitation, to obtain a solution containing catalyst precursor particles (Pt—Co mixed particles). Next, the carrier suspension A containing 0.2 g of the acid-treated carbon carrier A was added to the resultant solution and was then stirred and mixed with a stirrer at a room temperature (25° C.) for 48 hours, to support the catalyst precursor particles on the carrier. Thereafter, the catalyst precursor particle-supported carrier was washed with ultrapure water after being filtered. After the above filtering and washing were repeated three times in total, a carrier having a catalyst particle supported thereon was obtained by filtering.

After being dried at 60° C. for 12 hours, the carrier having a catalyst particle supported thereon was subjected to heat-treatment process at 600° C. for 120 minutes in an argon gas atmosphere. Thus, an electrode catalyst 1-2 was obtained. Further, in the electrode catalyst 1-2, a supported concentration (supported amount) of the catalyst particle was 32.4 wt % (Pt: 28.0 wt %, Co: 4.4 wt %) with respect to the carrier. The supported concentration was measured by ICP analysis. The same is applied to the following.

Next, with respect to the electrode catalyst 1-2, the number average particle diameter ($d_N$) and the area average particle diameter ($d_A$) were calculated, to find to be 5.1 nm and 8.5 nm, respectively. Thus, the $d_N/d_A$ ratio of the electrode catalyst 1-2 was 0.60. Further, in the electrode catalyst 1-2, the extent of ordering was measured to be 66%. In addition, the LP ratio was 17.4%.

With respect to the electrode catalyst 1-2, potential scanning was performed at a speed of 10 mV/s from 0.2 V to 1.2 V in 0.1 M perchloric acid of 25° C. saturated with oxygen, and then a skin layer was measured, to find that the number of skin layers was 0 to 1.

Example 2-2

An electrode catalyst 2-2 was obtained in the same manner as in Example 1-2 except that heat-treatment was performed at 700° C. for 120 minutes in an argon gas atmosphere in Example 1-2. In the electrode catalyst 2-2, a supported concentration (supported amount) of the catalyst particle was 34.5 wt % (Pt: 29.7 wt %, Co: 4.8 wt %) with respect to the carrier.

Next, with respect to the electrode catalyst 2-2, the number average particle diameter ($d_N$) and the area average particle diameter ($d_A$) were calculated, to find to be 5.5 nm and 10.4 nm, respectively. Thus, the $d_N/d_A$ ratio of the electrode catalyst 2-2 was 0.53. Further, in the electrode catalyst 2-2, the extent of ordering was measured to be 60%. In addition, the LP ratio was 24.7%.

Example 3-2

An electrode catalyst 3-2 was obtained in the same manner as in Example 1-2 except that heat-treatment was performed at 400° C. for 4 hours under a 100 vol % hydrogen gas atmosphere in Example 1-2. In the electrode catalyst 3-2, a supported concentration (supported amount) of the catalyst particle was 34.6 wt % (Pt: 28.9 wt %, Co: 4.9 wt %) with respect to the carrier.

Next, with respect to the electrode catalyst 3-2, the number average particle diameter ($d_N$) and the area average particle diameter ($d_A$) were calculated, to find to be 6.1 nm and 11.8 nm, respectively. Thus, the $d_N/d_A$ ratio of the electrode catalyst 3-2 was 0.52. Further, in the electrode catalyst 3-2, the extent of ordering was measured to be 31%. In addition, the LP ratio was 10% or more.

With respect to the electrode catalyst 3-2, potential scanning was performed at a speed of 10 mV/s from 0.2 V to 1.2 V in 0.1 M perchloric acid of 25° C. saturated with oxygen, and then a skin layer was measured, to find that the number of skin layers was 1 to 3.

Example 4-2

An electrode catalyst 4-2 was obtained in the same manner as in Example 1-2 except that heat-treatment was performed at 600° C. for 2 hours in a 100 vol % hydrogen gas atmosphere in Example 1-2. In the electrode catalyst 4-2, a supported concentration (supported amount) of the catalyst particle was 34 wt % (Pt: 29.2 wt %, Co: 4.8 wt %) with respect to the carrier.

Next, with respect to the electrode catalyst 4-2, the number average particle diameter ($d_N$) and the area average particle diameter ($d_A$) were calculated, to find to be 5.8 nm and 9.7 nm, respectively. Thus, the $d_N/d_A$ ratio of the electrode catalyst 4-2 was 0.59. Further, in the electrode catalyst 4-2, the extent of ordering was measured to be 59%. In addition, the LP ratio was 10% or more.

With respect to the electrode catalyst 4-2, potential scanning was performed at a speed of 10 mV/s from 0.2 V to 1.2 V in 0.1 M perchloric acid of 25° C. saturated with oxygen, and then a skin layer was measured, to find that the number of skin layers was 0 to 2.

Example 5-2

7.3 mL (45 mg in terms of Co) of 0.105 M aqueous cobalt chloride ($CoCl_2.6H_2O$) solution and 0.12 mL (30.7 mg in terms of platinum) of 1.32 M aqueous chloroplatinic acid ($H_2[PtCl_6].6H_2O$) solution were charged into 1000 ml of ultrapure water in a beaker. The resulting solution was stirred and mixed with a stirrer at a room temperature (25° C.) for five minutes, to prepare a mixed solution.

Separately, 0.4 g of trisodium citrate dihydrate and 0.15 g of sodium borohydride were dissolved in 100 mL of ultrapure water, to prepare a reducing agent solution.

100 mL of the above-prepared reducing agent solution was charged into the above resulting mixed solution, and then stirred and mixed with a stirrer at a room temperature (25° C.) for 30 minutes, followed by being subjected to reduction and precipitation, to obtain a solution containing catalyst precursor particles (Pt—Co mixed particles). Next, 100 mL of an aqueous dispersion containing 0.2 g of a carbon carrier (Ketjen Black (registered trademark) Ketjen-Black EC300J produced by Lion Corporation, average particle diameter: 40 nm, BET specific surface area: 800 m²/g) was added to this solution, and then stirred and mixed with a stirrer at a room temperature (25° C.) for 48 hours, to support the catalyst precursor particles on the carrier. Thereafter, the catalyst precursor particle-supported carrier was washed with ultrapure water after being filtered. After the above filtering and washing were repeated three times in total, a carrier having a catalyst particle supported thereon was obtained by filtering.

After being dried at 60° C. for 12 hours, the carrier having a catalyst particle supported thereon was subjected to heat-treatment process at 600° C. for 120 minutes in a 100 vol % hydrogen gas atmosphere. Thus, an electrode catalyst 5-2 was obtained. In the electrode catalyst 5-2, a supported concentration (supported amount) of the catalyst particle was 14.3 wt % (Pt: 11.8 wt %, Co: 2.5 wt %) with respect to the carrier.

Next, with respect to the electrode catalyst 5-2, the number average particle diameter ($d_N$) and the area average particle diameter ($d_A$) were calculated, to find to be 6.0 nm and 8.1 nm, respectively. Thus, the $d_N/d_A$ ratio of the electrode catalyst 5-2 was 0.74. Further, in the electrode catalyst 5-2, the extent of ordering was measured to be 47%. In addition, the LP ratio was 13.4%.

With respect to the electrode catalyst 5-2, potential scanning was performed at a speed of 10 mV/s from 0.2 V to 1.2 V in 0.1 M perchloric acid of 25° C. saturated with oxygen, and then a skin layer was measured, to find that the number of skin layers was 0 to 1.

Example 6-2

36.3 mL (225 mg in terms of Co) of 0.105 M aqueous cobalt chloride ($CoCl_2.6H_2O$) solution and 0.6 mL (153 mg in terms of platinum) of 1.32 M aqueous chloroplatinic acid ($H_2[PtCl_6].6H_2O$) solution were charged into 1000 ml of ultrapure water in a beaker. The resulting solution was stirred and mixed with a stirrer at a room temperature (25° C.) for five minutes, to prepare a mixed solution.

Separately, 2 g of trisodium citrate dihydrate and 0.67 g of sodium borohydride were dissolved in 100 mL of ultrapure water, to prepare a reducing agent solution.

100 mL of the above-prepared reducing agent solution was charged into the above resulting mixed solution, and then stirred and mixed with a stirrer at a room temperature (25° C.) for 30 minutes, followed by being subjected to reduction and precipitation, to obtain a solution containing catalyst precursor particles (Pt—Co mixed particles). Next, 100 mL of an aqueous dispersion containing 0.2 g of a carbon carrier (Ketjen Black (registered trademark) Ketjen-Black EC300J produced by Lion Corporation, average particle diameter: 40 nm, BET specific surface area: 800 m²/g) was added to this solution, and then stirred and mixed with a stirrer at a room temperature (25° C.) for 48 hours, to support the catalyst precursor particles on the carrier. Thereafter, the catalyst precursor particle-supported carrier was washed with ultrapure water after being filtered. After the above filtering and washing were repeated three times in total, a carrier having a catalyst particle supported thereon was obtained by filtering. After being dried at 60° C. for 12 hours, the carrier having a catalyst particle supported thereon was subjected to heat-treatment process at 600° C. for 120 minutes in a 100 vol % hydrogen gas atmosphere. Thus, an electrode catalyst 6-2 was obtained. In the electrode catalyst 6-2, a supported concentration (supported amount) of the catalyst particle was 49.1 wt % (Pt: 42.0 wt %, Co: 7.1 wt %) with respect to the carrier. In addition, the LP ratio was 29.0%.

Next, with respect to the electrode catalyst 6-2, the number average particle diameter ($d_N$) and the area average particle diameter ($d_A$) were calculated, to find to be 5.5 nm and 11.8 nm, respectively. Thus, the $d_N/d_A$ ratio of the electrode catalyst 6-2 was 0.47. Further, in the electrode catalyst 6-2, the extent of ordering was measured to be 68%.

Example 7-2

An electrode catalyst 7-2 was obtained in the same manner as in Example 1-2 except that heat-treatment was performed at 800° C. for 30 minutes in a 100 vol % hydrogen gas atmosphere in Example 1-2. In the electrode catalyst 7-2, a supported concentration (supported amount) of the catalyst particle was 34.6 wt % (Pt: 30.0 wt %, Co: 4.6 wt %) with respect to the carrier.

Next, with respect to the electrode catalyst 7-2, the number average particle diameter ($d_N$) and the area average particle diameter ($d_A$) were calculated, to find to be 7.0 nm and 14.1 nm, respectively. Thus, the $d_N/d_A$ ratio of the electrode catalyst 7-2 was 0.50. Further, in the electrode catalyst 7-2, the extent of ordering was measured to be 49%. In addition, the LP ratio was 16.7%.

With respect to the electrode catalyst 7-2, potential scanning was performed at a speed of 10 mV/s from 0.2 V to 1.2

V in 0.1 M perchloric acid of 25° C. saturated with oxygen, and then a skin layer was measured, to find that the number of skin layers was 1 to 2.

Example 8-2

65.4 mL (405 mg in terms of Co) of 0.105 M aqueous cobalt chloride ($CoCl_2.6H_2O$) solution and 0.36 mL (92 mg in terms of platinum) of 1.32 M aqueous chloroplatinic acid ($H_2[PtCl_6].6H_2O$) solution were charged into 1000 ml of ultrapure water in a beaker. The resulting solution was stirred and mixed with a stirrer at a room temperature (25° C.) for five minutes, to prepare a mixed solution.

Separately, 1.2 g of trisodium citrate dihydrate and 0.4 g of sodium borohydride were dissolved in 100 mL of ultrapure water, to prepare a reducing agent solution.

100 mL of the above-prepared reducing agent solution was charged into the above resulting mixed solution, and then stirred and mixed with a stirrer at a room temperature (25° C.) for 30 minutes, followed by being subjected to reduction and precipitation, to obtain a solution containing catalyst precursor particles (Pt-Comixed particles). Next, 100 mL of an aqueous dispersion containing 0.2 g of a carbon carrier (Ketjen Black (registered trademark) Ketjen-Black EC300J produced by Lion Corporation, average particle diameter: 40 nm, BET specific surface area: 800 $m^2/g$) was added to this solution, and then stirred and mixed with a stirrer at a room temperature (25° C.) for 48 hours, to support the catalyst precursor particles on the carrier. Thereafter, the catalyst precursor particle-supported carrier was washed with ultrapure water after being filtered. After the above filtering and washing were repeated three times in total, a carrier having a catalyst particle supported thereon was obtained by filtering. After being dried at 60° C. for 12 hours, the carrier having a catalyst particle supported thereon was subjected to heat-treatment process at 600° C. for 120 minutes in a 100 vol % hydrogen gas atmosphere. Thus, an electrode catalyst 8-2 was obtained. In the electrode catalyst 8-2, a supported concentration (supported amount) of the catalyst particle was 33 wt % (Pt: 28.7 wt %, Co: 4.3 wt %) with respect to the carrier.

Next, with respect to the electrode catalyst 8-2, the number average particle diameter ($d_N$) and the area average particle diameter ($d_A$) were calculated, to find to be 4.6 nm and 9.2 nm, respectively. Thus, the $d_N/d_A$ ratio of the electrode catalyst 8-2 was 0.49. Further, in the electrode catalyst 8-2, the extent of ordering was measured to be 58%. In addition, the LP ratio was 10% or more.

With respect to the electrode catalyst 8-2, potential scanning was performed at a speed of 10 mV/s from 0.2 V to 1.2 V in 0.1 M perchloric acid of 25° C. saturated with oxygen, and then a skin layer was measured, to find that the number of skin layers was 0 to 3.

Comparative Example 1-2

A comparative electrode catalyst 1-2 was obtained in the same manner as in Example 1-2 except that heat-treatment was performed at 400° C. for 120 minutes in a 100 vol % hydrogen gas atmosphere in Example 1-2. In the comparative electrode catalyst 1-2, a supported concentration (supported amount) of the catalyst particle was 33.8 wt % (Pt: 28.4 wt %, Co: 5.4 wt %) with respect to the carrier.

Next, with respect to the comparative electrode catalyst 1-2, the number average particle diameter ($d_N$) and the area average particle diameter ($d_A$) were calculated, to find to be 5.7 nm and 9.1 nm, respectively. Thus, the $d_N/d_A$ ratio of the comparative electrode catalyst 1-2 was 0.63. Further, in the comparative electrode catalyst 1-2, the extent of ordering was measured to be 24%.

With respect to the comparative electrode catalyst 1-2, potential scanning was performed at a speed of 10 mV/s from 0.2 V to 1.2 V in 0.1 M perchloric acid of 25° C. saturated with oxygen, and then a skin layer was measured, to find that the number of skin layers was 0 to 2.

Comparative Example 2-2

A comparative electrode catalyst 2-2 was obtained in the same manner as in Example 1-2 except that heat-treatment was not performed in Example 1-2. In the comparative electrode catalyst 2-2, a supported concentration (supported amount) of the catalyst particle was 33.8 wt % (Pt: 28.9 wt %, Co: 4.9 wt %) with respect to the carrier.

Next, with respect to the comparative electrode catalyst 2-2, the number average particle diameter ($d_N$) and the area average particle diameter ($d_A$) were calculated, to find to be 2.8 nm and 3.0 nm, respectively. Thus, the $d_N/d_A$ ratio of the comparative electrode catalyst 2-2 was 0.93. Further, in the comparative electrode catalyst 2-2, the extent of ordering was measured to be 0%.

Comparative Example 3-2

A comparative electrode catalyst 3-2 was obtained in the same manner as in Example 1-2 except that heat-treatment was performed at 800° C. for 60 minutes in a 100 vol % hydrogen gas atmosphere in Example 1-2. In the comparative electrode catalyst 3-2, a supported concentration (supported amount) of the catalyst particle was 35.5 wt % (Pt: 30.3 wt %, Co: 5.2 wt %) with respect to the carrier.

Next, with respect to the comparative electrode catalyst 3-2, the number average particle diameter ($d_N$) and the area average particle diameter ($d_A$) were calculated, to find to be 9.5 nm and 41.8 nm, respectively. Thus, the $d_N/d_A$ ratio of the comparative electrode catalyst 3-2 was 0.23. Further, in the comparative electrode catalyst 3-2, the extent of ordering was measured to be 71%.

The heat-treatment conditions, the supported concentration, the number average particle diameter ($d_N$), the area average particle diameter ($d_A$), the $d_N/d_A$ ratio, and the extent of ordering of the electrode catalyst of each of Examples 1-2 to 8-2 and Comparative Examples 1-2 to 3-2 are summarized in Table 1 as follows.

TABLE 1

| | | Supported concentration | | Catalyst powder | | | Extent of |
|---|---|---|---|---|---|---|---|
| | | Pt | Co | | | | |
| | Heat-treatment conditions | (wt %) | (wt %) | $d_N$ [nm] | $d_A$ [nm] | $d_N/d_A$ | ordering (%) |
| Example 1-2 | Ar Atmosphere, 600° C. × 120 Minutes | 28.0 | 4.4 | 5.1 | 8.5 | 0.60 | 66 |
| Example 2-2 | Ar Atmosphere, 700° C. × 120 Minutes | 29.7 | 4.8 | 5.5 | 10.4 | 0.53 | 60 |
| Example 3-2 | $H_2$ Atmosphere, 400° C. × 480 Minutes | 28.9 | 4.9 | 6.1 | 11.8 | 0.52 | 31 |
| Example 4-2 | $H_2$ Atmosphere, 600° C. × 120 Minutes | 29.2 | 4.8 | 5.8 | 9.7 | 0.59 | 59 |

TABLE 1-continued

|  | Heat-treatment conditions | Supported concentration Pt (wt %) | Co (wt %) | Catalyst powder $d_N$ [nm] | $d_A$ [nm] | $d_N/d_A$ | Extent of ordering (%) |
|---|---|---|---|---|---|---|---|
| Example 5-2 | $H_2$ Atmosphere, 600° C. × 120 Minutes | 11.8 | 2.5 | 6.0 | 8.1 | 0.74 | 47 |
| Example 6-2 | $H_2$ Atmosphere, 600° C. × 120 Minutes | 42.0 | 7.1 | 5.5 | 11.8 | 0.47 | 68 |
| Example 7-2 | $H_2$ Atmosphere, 800° C. × 30 Minutes | 30.0 | 4.6 | 7.0 | 14.1 | 0.50 | 49 |
| Example 8-2 | $H_2$ Atmosphere, 600° C. × 120 Minutes | 28.7 | 4.3 | 4.6 | 9.2 | 0.49 | 58 |
| Comparative Example 1-2 | $H_2$ Atmosphere, 400° C. × 120 Minutes | 28.4 | 5.4 | 5.7 | 9.1 | 0.63 | 24 |
| Comparative Example 2-2 | — | 28.9 | 4.9 | 2.8 | 3.0 | 0.93 | 0 |
| Comparative Example 3-2 | $H_2$ Atmosphere, 800° C. × 60 Minutes | 30.3 | 5.2 | 9.5 | 41.8 | 0.23 | 71 |

(Evaluation of Catalyst Performance)
<Durability Test>

For the electrode catalyst (comparative electrode catalyst) of each Example and each Comparative Example, the following test was performed. A cycle was repeated 10,000 times in which after an electrode potential with respect to a reversible hydrogen electrode (RHE) was held to 0.6 V for three seconds in 0.1 M perchloric acid of 60° C. saturated with $N_2$ gas, the potential instantly rose to 1.0 V and was held for three seconds at 1.0 V, followed by being instantly returned to 0.6 V. In order to apply a voltage, the electrode catalyst is supported on a rotating disk electrode in a durability test as follows.

<Measurement of Area Specific Activity>

An electrode for evaluation was prepared in such a manner that the electrode catalyst (comparative electrode catalyst) of each Example and each Comparative Example was uniformly dispersed with Nafion and supported on a rotating disk electrode (geometric area: 0.19 cm$^2$) composed of glassy carbon disk having a diameter of 5 mm so as to give 34 μg·cm$^{-2}$.

For the electrode of each Example and each Comparative Example, a cyclic voltammetry was performed at a scanning rate of 50 mVs$^{-1}$ in a potential range of 0.05 to 1.2 V with respect to the reversible hydrogen electrode (RHE), in 0.1 M perchloric acid of 25° C. saturated with $N_2$ gas. From the area of hydrogen adsorption peak appearing in the range of 0.05 to 0.4 V of the resulting voltammogram, an electrochemical surface area (cm$^2$) of each electrode catalyst (comparative electrode catalyst) was calculated.

Next, by using an electrochemical measuring device, potential scanning was performed at a speed of 10 mV/s from 0.2 V to 1.2 V in 0.1 M perchloric acid of 25° C. saturated with oxygen. Moreover, from the current obtained by the potential scanning, an influence of mass transfer (oxygen diffusion) was corrected using the Koutecky-Levich equation, and then a current value at 0.9 V was extracted. The obtained current value was divided by the above-described electrochemical surface area, to obtain a value of area specific activity (μAcm$^{-2}$). The method of using the Koutecky-Levich equation is disclosed in, for example, "4 Analysis of oxygen reduction reaction on Pt/C catalyst" in Electrochemistry Vol. 79, No. 2, p. 116 to 121 (2011) (Hydrodynamic voltammogram (1) oxygen reduction (RRDE)). The extracted current value of 0.9 V is divided by the electrochemical surface area, to calculate area specific activity.

The area specific activity was measured for the electrode catalyst before and after the durability test. The results are shown in the following Table 2. In the following Table 2, the area specific activity (μAcm$^{-2}$) before the durability test and the area specific activity (μAcm$^{-2}$) after the durability test are described, respectively.

TABLE 2

| | Heat-treatment conditions | | | Catalyst particle | | | Catalyst Supported concentration | | Results | |
|---|---|---|---|---|---|---|---|---|---|---|
| | Heat-treatment temperature (° C.) | Heat-treatment time (min.) | Atmosphere | LP ratio (%) | Extent of ordering (%) | Number average particle diameter (nm) | Pt (wt %) | Co (wt %) | Area specific activity before durability test (μAcm$^{-2}$) | Area specific activity after durability test (μAcm$^{-2}$) |
| Example 1-1 | 600 | 120 | Ar | 17.4 | 66 | 5.1 | 28.0 | 4.4 | 4462 | 1561 |
| Example 2-1 | 600 | 120 | $H_2$ | 13.4 | 47 | 6.0 | 11.8 | 2.5 | 3674 | 1564 |
| Example 3-1 | 600 | 120 | $H_2$ | 29.0 | 68 | 5.5 | 42.0 | 7.1 | 5694 | 1460 |
| Example 4-1 | 700 | 120 | Ar | 24.7 | 60 | 5.5 | 29.7 | 4.8 | 4555 | 1440 |
| Example 5-1 | 800 | 30 | $H_2$ | 16.7 | 49 | 7.0 | 30.0 | 4.6 | 6431 | 1568 |
| Example 6-1 | 800 | 60 | Ar | 24.0 | 62 | 5.6 | 30.1 | 4.8 | 4046 | 1372 |
| Comparative Example 1-1 | | | | 41.7 | 0 | 2.8 | 28.9 | 4.9 | 1942 | 980 |

From Table 2, it is noted that the electrode catalyst (catalyst particle) of the present invention has significantly improved initial activity and activity after the durability test.

<Measurement of Mass Specific Activity>

An electrode for evaluation was prepared in such a manner that the electrode catalyst of each Example and each Comparative Example was uniformly dispersed with Nafion and supported on a rotating disk electrode (geometric area: 0.19 cm$^2$) composed of glassy carbon disk having a diameter of 5 mm such that the supported amount of platinum per unit area was 34 μg/cm$^2$.

Next, by using an electrochemical measuring device, potential scanning was performed at a speed of 10 mV/s from 0.2 V to 1.2 V in 0.1 M perchloric acid of 25° C. saturated with oxygen. Moreover, from the current obtained by the potential scanning, an influence of mass transfer (oxygen diffusion) was corrected using the Koutecky-Levich equation, and then a current value at 0.9 V was extracted. The obtained current value was divided by the whole supported amount (6.5 μg) of platinum calculated from the supported amount of platinum per unit area, to obtain a value of mass specific activity (A/g Pt). The method of using the Koutecky-Levich equation is disclosed in, for example, "4 Analysis of oxygen reduction reaction on Pt/C catalyst" in Electrochemistry Vol. 79, No. 2, p. 116 to 121 (2011) (Hydrodynamic voltammogram (1) oxygen reduction (RRDE)).

The mass specific activity was measured for the electrode catalyst before and after the durability test. The results are shown in the following Table 3. In the following Table 3, the mass specific activity (A/g) before the durability test and the mass specific activity (A/g) after the durability test are described, respectively.

TABLE 3

| | $d_N/d_A$ | Extent of ordering (%) | Mass specific activity before durability test (A/g) | Mass specific activity after durability test (A/g) |
|---|---|---|---|---|
| Example 1-2 | 0.60 | 66 | 1947 | 577 |
| Example 2-2 | 0.53 | 60 | 1897 | 535 |
| Example 3-2 | 0.52 | 31 | 1255 | 337 |
| Example 4-2 | 0.59 | 59 | 2028 | 467 |
| Example 5-2 | 0.74 | 47 | 1828 | 628 |
| Example 6-2 | 0.47 | 68 | 1807 | 384 |
| Example 7-2 | 0.50 | 49 | 2167 | 488 |
| Example 8-2 | 0.49 | 58 | 1711 | 443 |
| Comparative Example 1-2 | 0.63 | 24 | 1085 | 367 |
| Comparative Example 2-2 | 0.93 | 0 | 989 | 289 |
| Comparative Example 3-2 | 0.23 | 71 | 1058 | 315 |

From Table 3 described above, it is noted that the electrode catalyst (a catalyst particle) of the present invention has significantly improved initial mass specific activity and mass specific activity after the durability test, as compared to Comparative Example 2-2 having no L1$_2$ structure as an internal structure, Comparative Example 1-2 in which the extent of ordering of the L1$_2$ structure is less than 30%, or Comparative Example 3-2 in which the $d_N/d_A$ ratio is less than 0.4. In addition, from Table 3 described above, it is found that the mass specific activity can be further improved when the extent of ordering is 30% or more.

The invention claimed is:

1. A method of producing a catalyst, comprising:
   (1) preparing a mixed solution containing a platinum precursor and a non-platinum metal precursor;
   (2) adding a reducing agent to the mixed solution, and reducing the platinum precursor and the non-platinum metal precursor simultaneously, thereby obtaining a catalyst precursor particle-containing liquid;
   (3) adding a carbon carrier to the catalyst precursor particle-containing liquid, thereby obtaining a catalyst precursor particle-supported carrier, the carbon carrier having at least one or more functional groups selected from the group consisting of a lactone group, a hydroxyl group, an ether group, or a carbonyl group formed on a surface thereof in a total amount of 0.5 μmol/m$^2$ or more; and
   (4) subjecting the catalyst precursor particle-supported carrier to heat-treatment.

2. The method according to claim 1, wherein the carbon carrier is obtained by contacting a carbon material with an acidic solution and then subjecting the carbon material to heat-treatment.

3. The method according to claim 1, wherein a ratio of a non-platinum metal contained in the non-platinum metal precursor to platinum contained in the platinum precursor (molar ratio of the non-platinum metal to the platinum) is in a range of 0.4 to 20.

4. The method according to claim 1, wherein the heat-treatment of the catalyst precursor particle-supported carrier is performed:
   (a) at a temperature in a range of 350 to 450° C. for a time exceeding 120 minutes under a reducing gas atmosphere or an inert gas atmosphere;
   (b) at a temperature exceeding 450° C. but 750° C. or lower for 10 minutes or more under a reducing gas atmosphere or an inert gas atmosphere;
   (c) at a temperature exceeding 750° C. for a time of 10 to 120 minutes under an inert gas atmosphere; or
   (d) at a temperature exceeding 750° C. for a time of 10 to 45 minutes under a reducing gas atmosphere.

5. A catalyst produced by the method set forth in claim 1.

* * * * *